US005822773A

United States Patent [19]

Pritchard et al.

[11] Patent Number: 5,822,773

[45] Date of Patent: Oct. 13, 1998

[54] METHOD AND SYSTEM FOR ACCELERATING THE COPYING OF REPETITIVELY COPIED COMPUTER DATA

[75] Inventors: Jeff Pritchard, Fremont; Norman Fong, San Francisco, both of Calif.

[73] Assignee: FWB Software LLC, Menlo Park, Calif.

[21] Appl. No.: 734,411

[22] Filed: Oct. 17, 1996

[51] Int. Cl.[6] .................................................... G06F 12/02

[52] U.S. Cl. ............................................................ 711/162

[58] Field of Search .................................... 711/161, 162; 395/380

[56] References Cited

U.S. PATENT DOCUMENTS

| | | | |
|---|---|---|---|
| 5,237,668 | 8/1993 | Blandy et al. | 711/2 |
| 5,321,826 | 6/1994 | Ushiro | 711/162 |
| 5,410,661 | 4/1995 | Tamura | 395/710 |
| 5,638,505 | 6/1997 | Hemanway | 345/348 |
| 5,668,941 | 9/1997 | Npprbakish | 345/434 |

*Primary Examiner*—David Y. Eng
*Attorney, Agent, or Firm*—McCutchen, Doyle, Brown & Enersen, LLP

[57] ABSTRACT

The present invention is a method, apparatus and computer program product for accelerating the copying of computer data that is repetitively copied from a source computer data storage medium to a destination computer data storage medium. The invention involves identifying situations in which computer data is repetitively copied and monitoring the copying, including noting the locations where the data is stored on the source computer storage medium. Without physically moving the data on the source computer storage medium, the data to be copied is gathered into groups based on the data locations in such a manner that future copying of this data from this source storage medium will be accelerated. During future copying of this data, the groups of data are copied together to the destination computer storage medium before the copying of the data is required. The data to be copied is grouped based on the physical copying characteristics of the source computer storage medium. These characteristics can vary with the type of medium and with the particular medium. The groups are chosen so that copying the groups of data together is more efficient than the individual copying that occurred during the monitoring. There are various situations in which computer data is repetitively copied in such a manner that future copying can be accelerated. The acceleration is most effective when the copying occurs in such a manner that the operating system or some other controlling software program cannot predict the order in which data will be loaded. This is particularly true when the data copying is being controlled by multiple computer programs, or the data being copied is not stored in a series of consecutive source storage medium locations.

38 Claims, 13 Drawing Sheets

METHOD AND SYSTEM FOR ACCELERATING THE COPYING OF REPETITIVELY COPIED COMPUTER DATA

BACKGROUND OF THE INVENTION

The present invention relates generally to the field of computer system performance enhancement and more particularly to accelerating the copying of repetitively copied computer data.

The operation of a computer system typically involves the transfer of large amounts of computer data, including both executable code and non-executable information, between different computer data storage mediums. Such data is typically used by both system software such as the operating system and by other software programs such as application programs, and the execution of the software requires such transfers. While data can be permanently transferred from one storage medium to another (i.e. moved), it is more often the case that the data is merely copied, leaving the data on both the source and the destination storage mediums.

As computer systems have evolved over time, so too have computer storage mediums, resulting in a wide variety of storage medium types. Almost every computer system built today will have at least three computer storage mediums, although none of the three are required, including the following: a nonvolatile mass storage device which holds large amounts of data (such as a magnetic hard disk), a read-write random-access computer memory (RAM) that typically holds less data than a mass storage device but can be accessed more quickly by the central processing unit (CPU) of the computer system than a mass storage device (often referred to as main memory), and a nonvolatile read-only memory (ROM) that typically holds data required by the computer system immediately upon computer system startup. Nonvolatile storage mediums can preserve the data stored on them without a continuous supply of electricity. Most computer systems will have several other computer data storage mediums from a wide variety of possible types, including additional levels of RAM and magnetic hard disks, at least one magnetic floppy drive, a Digital Video Disk (DVD), a CD-Recordable drive, a magneto-optical drive, a magnetic tape drive, etc. The various drive mechanisms typically allow for removable storage media of the appropriate type, thus allowing for multiple individual storage mediums for a given drive.

Increasingly, computer systems are attached to computer networks that provide for the transfer of computer data. Various other devices are typically attached to the networks, including mass data storage mediums, and mass data storage drives that accept removable mass storage mediums. Thus, data is commonly copied not only between storage mediums on a given computer system, but also between storage mediums that are separated by a computer network. For example, it is common to copy data from a mass storage medium attached to a network to a magnetic hard drive of a computer system also attached to the network, or from a magneto-optical drive on the network to the RAM of a computer system on the network.

Data transfers occasionally occur when there is not an immediate need for the data, such as while a computer system is not otherwise in use, and in these cases the length of time required to transfer the data may not be a major concern. However, it is more common that the length of time of data transfer is very important. It is often the case that the data is being transferred because a software program executing on a computer system requires the data, and the CPU may remain idle or the computer system may be unavailable for other use until data transfer is complete. In addition, data transfers over networks are increasingly subject to use charges that vary with the length of use, such as with commercial on-line services or long-distance telephone charges.

Since minimizing the length of time required for data transfer is typically of major importance, one desirable option would be to permanently store the required data on the destination medium so that the need for data transfer is eliminated. Even if a consistent set of required data is known, this is not always possible. Local storage mediums are often too small to hold all required data, so some data must be transferred from larger non-local storage mediums. Additionally, most computers require that for data to be accessible to the CPU, it must be stored in memory-addressable RAM. However, most RAM is volatile, retaining information only while electricity is supplied to the RAM. Therefore, even if the same data is always needed by the CPU during the startup or operation of the computer, it must still be copied into volatile RAM every time the computer is restarted. Copying of data into RAM is often referred to as loading, and the startup phase of a computer, during which programs other than system software are not typically loaded or executed, is referred to as the boot phase.

If a writer of an executable software program knows that a particular set of data will consistently need to be copied together from a specific source storage medium, the writer can take steps to minimize the length of time required for the copying. For example, the writer of an operating system may know that certain data will always need to be loaded into RAM as part of the startup of a computer. Alternately, the writer of a large application program may know that after executing a certain portion of a program, another portion will be executed. In such a case, the software writer can attempt to store the data on the source storage medium in a way that will facilitate copying, can attempt to maximize the amount of data that is actually copied at any time, and can attempt to copy data before it is actually required.

By understanding the physical characteristics of a source storage medium, data can often be stored in a manner that will facilitate its copying. For example, the common magnetic disk medium consists of one or more circular platters that rotate at constant speed. Each platter is divided into concentric tracks, and each track is divided into sectors, sectors being the smallest unit that can be read or written. A movable arm containing a read/write head is located just above the surface of the platter. As the disk rotates and the arm moves, the data stored on the sector underneath the read/write head can be read, or data can be written to the sector. Thus, if an amount of data requiring two sectors to store will always be copied together, it is more efficient to store the data in adjacent sectors on the same track than in sectors on opposite sides of the disk. If the data is in adjacent sectors, then the data stored in the second sector can be read immediately after the data stored in the first sector, since the rotation of the platter will move the read/write head over the second sector immediately after it is over the first sector. If the second sector is on the other side of the disk, however, the data cannot be copied from the second sector until the platter rotates enough so that the second sector is underneath the read/write head. If the second sector is on a different track, the copying will also be delayed as the arm moves the read/write head to be above that track. Other types of storage mediums may have different physical characteristics, but data can typically be stored on a particular medium in a manner that will facilitate copying if it is known that a particular set of data will consistently need to be copied together.

The amount of data that is actually copied at any time can also often be maximized. While the transfer rate will be limited by the underlying physical media, it is important to copy data at the maximum rate possible. For example, the maximum transfer rate from a magnetic disk drive may correspond to the amount of data that can be stored on a sector being transferred in the amount of time that it takes to read the data from a sector. Thus, it is efficient to completely fill a sector with data so that when data is transferred from that sector, the maximum amount of data is transferred. If the same amount of data is instead spread over three sectors that do not contain additional data, it will take at least three times as long to transfer the same data, and the data transfer rate will be at most a third of the maximum.

Finally, the problems associated with waiting for data can be alleviated if it is possible to copy data before it is actually required. In the case of loading the operating system during startup, it is possible that a first set of data is required immediately, and that a second set of data will always be required later. If there is room available in RAM for all of the data, and it is possible to load the second set of data while the CPU is using the first set of data, then when the CPU requests the second set of data it will already be loaded. To optimize performance, many computer systems use multiple levels of RAM, including caches that supplement the main RAM memory. In such a system, the lowest level of RAM is closest to the CPU and will typically hold the data that is currently in use. Since it is typically much faster to copy data to the lowest level of RAM from a higher level of RAM rather than from a mass storage medium, many operating systems and other software programs attempt to keep the data that the CPU will need next in the next level of RAM. To the extent that the order of data that will be needed in the future can be known or predicted, this can alleviate problems associated with waiting for data.

Unfortunately, the problem of minimizing the length of time required for data transfer is complicated by the fact that it is not typically possible for the writers of executable software programs to predict exactly which data will be used by a particular computer user, and in what order the data will be used when the program is executing. The particular data required will typically vary with the combination of other programs being executed and the particular actions taken by user, so it is not typically possible to know beforehand the order of data that will be accessed. Operating systems will often try to predict data copy requests in order to maximize computer system performance, and one common method of predicting data to copy or load involves the concept of spatial locality. Spatial locality is the tendency to need data items that are stored close (spatially) to other recently accessed items. This principle holds that for a particular software program, the code that is stored near the currently executing code is likely to be needed soon because programs often follow a roughly linear order of execution. The principle also holds that for a particular group of non-executable data being used by an executing program, the data that is stored near the data currently in use is likely to be needed soon, since many data structures such as arrays store associated data together. Spatial locality can be useful in predicting the data to be needed if only one software program is executing, the software program is stored together as a single block, and the data used by the software program is stored together as a single block. However, when any of these conditions are not met, it can be extremely difficult to predict what data will be needed next by the CPU.

In particular, there are several common situations where data is repetitively copied and where more rapid copying of data would be beneficial, but where techniques such as spatial locality or optimization by software writers are not effective. For example, it is typically the case that during computer system booting, the operating system must be loaded into RAM before any other actions can be taken by the computer. If the operating system was a single set of data (software and non-executable data) that was written and installed together on a mass storage medium, it might be possible to load this data from the mass storage medium efficiently. However, it is often the case that an operating system writer provides for a basic level of functionality, and allows other third parties to write software that extends or modifies the basic functionality. In this situation, it is typical for numerous small operating system extensions to be installed by the user, each written by different third parties unaware of the other system extensions, and with the various extensions installed and removed by the user at different times and in different combinations. Each system extension can act as a small software program, being loaded itself and potentially loading a set of non-executable data. Although the group of extensions in use can change greatly over time, any particular computer system boot will typically be the same as or very similar to the previous computer system boot. However, because each system extension is small and because each extension works and is installed independently of other extensions, there is little spatial locality. In addition, because the extensions are written by different parties who are not aware of the presence of other extensions, there is not typically any single writer who can predict all of the computer data that must be loaded into RAM and who can thus attempt to optimize the loading.

Another similar situation arises when using a large software program that is originally written and loaded into RAM as a single group of data, but which is modified over time with multiple independent patch files. When writing and loading an entirely new version of a large software program is inconvenient, patch files are often used to fix a single bug or add a new functionality. This is accomplished by loading a patch file just after the original program is loaded, and having the patch file replace or modify some part of the original program so that the executable portion of the patch file is executed at the appropriate time. Over time, it is often the case that many patch files are in use at the same time, each independent and unaware of the others. Even if the writer of the original program and a patch file is the same, and the writer desires to store a patch file on a mass storage medium with the original program in such a way as to minimize the time required for later copying of the original program and all patch files, this is often not possible. As earlier mentioned, if the patch file could be stored immediately after the original program on the mass storage medium, this would often facilitate the copying of the patch file immediately after the copying of the original program. Unfortunately, it is often the case that the storage medium locations immediately after those used by the original program are not available at the time that a patch file is being installed, and thus a patch file must be stored elsewhere on the mass storage medium on the basis of where space is available, rather than where copying would be optimized.

Yet another common situation involves software programs other than operating systems that provide for a basic level of functionality, and allow other third parties to write software that extends or modifies the basic functionality. Similarly to the case of the operating system extensions, numerous small program extensions are often installed by the user, each written by different third parties unaware of the other program extensions, and with the various extensions installed and removed by users at different times and in different combinations. This is the case with popular software such as Adobe Photoshop® and Netscape Navigator®, among others. For the same reasons as those discussed above, the copying of such a program along with all of the installed extensions, whether into RAM or to another storage medium, is often time-consuming because the data is not stored efficiently and the location of the data that will need to be copied soon is not easily predictable using current techniques for predicting copy requests.

SUMMARY OF THE INVENTION

The present invention is a method, apparatus and computer program product for accelerating the copying of computer data that is repetitively copied from a source computer data storage medium to a destination computer data storage medium. The invention involves identifying situations in which computer data is repetitively copied and monitoring the copying, including noting the locations where the data is stored on the source computer storage medium. Without physically moving the data on the source computer storage medium, the data to be copied is gathered into groups based on the data locations in such a manner that future copying of this data from this source storage medium will be accelerated. During future copying of this data, the groups of data are copied together to the destination computer storage medium before the copying of the data is required.

The data to be copied is grouped based on the physical copying characteristics of the source computer storage medium. These characteristics can vary with the type of medium and with the particular medium. The groups are chosen so that copying the groups of data together is more efficient than the individual copying that occurred during the monitoring.

There are various situations in which computer data is repetitively copied in such a manner that future copying can be accelerated. The acceleration is most effective when the copying occurs in such a manner that the operating system or some other controlling software program cannot predict the order in which data will be loaded. This is particularly true when the data copying is being controlled by multiple computer programs, or the data being copied is not stored in a series of consecutive source storage medium locations. In one embodiment, the copying of data into RAM (i.e., the loading of data) is accelerated during the startup of the computer. In another embodiment, the loading of data into RAM is accelerated during the startup or execution of a software program which has the capability of loading and using various optional modules that are supplied by module writers different than the software program writer, and that are often added by a user separately from the installation of the software program. In another embodiment, the loading of data into RAM is accelerated during the startup or execution of a software program which has various patch files (that correct or add functionality) that are supplied by the same software program writer as that of the original program but installed separately from the software program. In yet another embodiment, the copying of data from a long-term source computer data storage medium to a shorter-term destination computer data storage medium is accelerated.

BRIEF DESCRIPTION OF THE DRAWINGS

The objects, features and advantages of the present invention will be made apparent in the following detailed description in which.

DETAILED DESCRIPTION OF THE INVENTION

Figure 1:
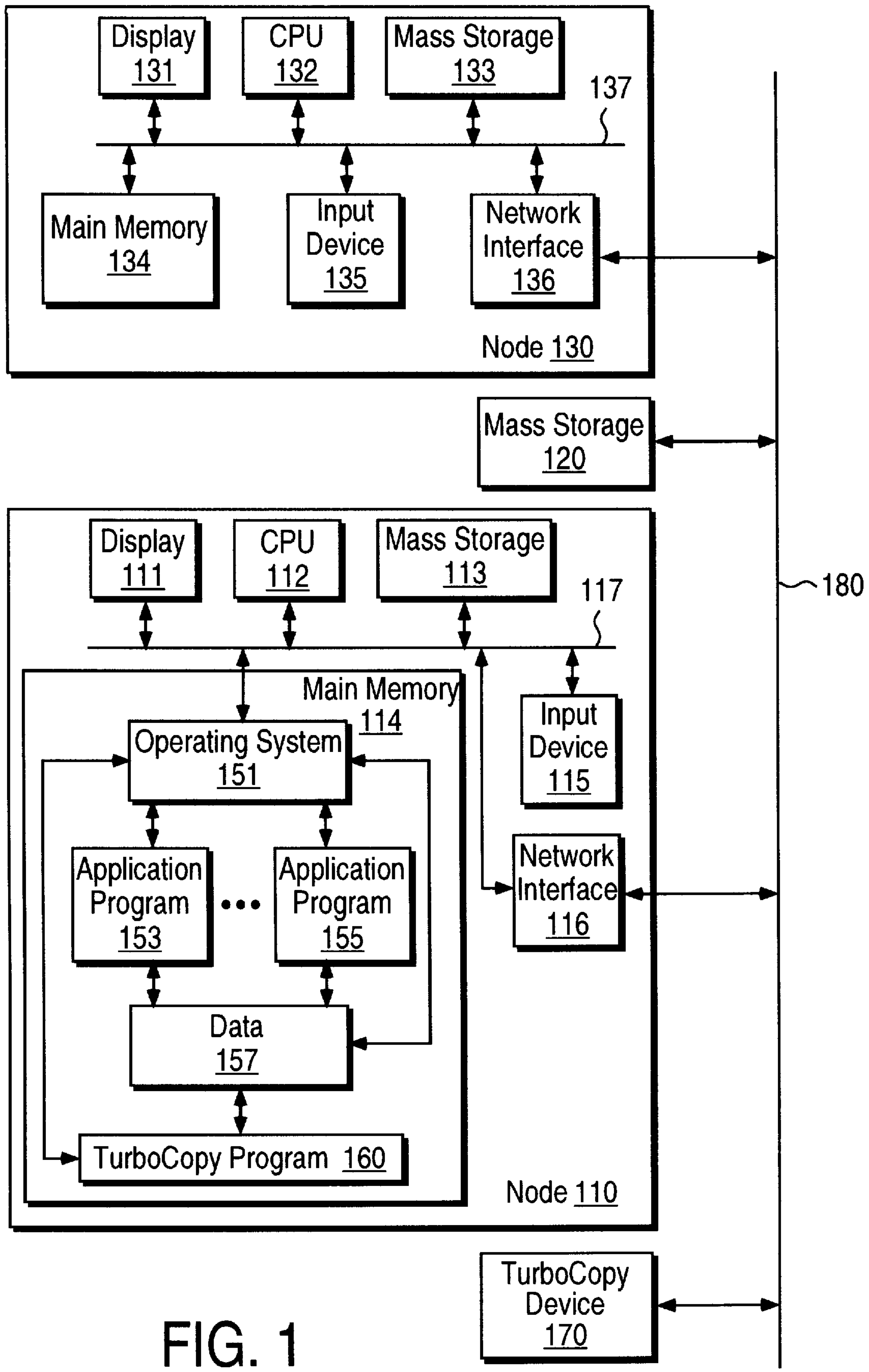
FIG. 1 illustrates a physical diagram of a typical computer network containing various network devices in accordance with the present invention.

A method, apparatus and computer program product are described for accelerating the copying of computer data that is repetitively copied from a source computer data storage medium to a destination computer data storage medium. The invention involves identifying situations in which computer data is repetitively copied and monitoring the copying, including noting the locations where the data to be copied is stored on the source computer storage medium. Without physically moving the data on the source computer storage medium, the data to be copied is placed into groups based on the source medium data locations in such a manner that future copying of this data from this source storage medium will be accelerated. During future copying of this data, the groups of data are copied together to the destination computer storage medium before the copying of the data is required.

There are various situations in which computer data is repetitively copied in such a manner that future copying can be accelerated. Acceleration is most effective when the copying occurs in such a manner that the operating system or some other controlling software program cannot predict the order in which data will be copied. This is often true when the data copying is being controlled by multiple computer programs, and when the data being copied is not stored in a series of consecutive source storage medium locations. In one embodiment, the copying of data into RAM (also referred to as loading of data) is accelerated during the startup of the computer. During computer startup, often referred to as the boot phase of the computer or booting the computer, the system software (including the operating system) is typically being loaded or executed, and other application programs are not yet executing. In another embodiment, the loading of data into RAM is accelerated during the startup or execution of a software program which has the capability of loading and using various optional modules that are supplied by module writers different than the software program writer, and that are often added by a user separately from the installation of the software program. In another embodiment, the loading of data into RAM is accelerated during the startup or execution of a software program which has various patch files (that correct or add functionality) that are supplied by the same software program writer as that of the original program but installed separately from the software program. In yet another embodiment, the copying of data from a long-term source computer data storage medium to a shorter-term destination computer data storage medium is accelerated. Those skilled in the art will appreciate that alternate embodiments can be obtained in other situations where computer data is repetitively copied.

Throughout this detailed description, numerous specific details are set forth, particularly in the description of an illustrated embodiment, such as specific types of source and destination computer data storage mediums, specific methods of grouping data in order to accelerate copying, and specific types of situations in which data copy acceleration is effective. Those of ordinary skill in the art will appreciate that the present invention may be practiced without such specific details and in alternate embodiments. In particular, the illustrated embodiment shown in FIGS. 4–13 describes the acceleration of data loaded into RAM during the startup of a computer system—however, the present invention is not limited to the details used in the illustrated embodiment such as a magnetic disk source medium and a RAM destination medium, to details specific to loading data into RAM rather than copying to some other destination storage medium, to details specific to copying of data during the computer boot phase, or to details specific to copying of data either within a computer system or over a network.

FIG. 1 shows a physical linkage diagram of a typical computer network in operation which may incorporate the present invention. The illustrated computer network includes four network nodes 110, 120, 130, and 170 and one computer network 180. Network nodes 110 and 130 are general purpose computers that may each independently embody the present invention. Mass storage 120 is a network node that is a mass computer data storage medium providing computer data to other network nodes. TurboCopy device 170 is a network node that is a special purpose hardware device embodying the present invention. Those skilled in the art will appreciate that additional nodes and networks are possible, and that the computer networks may be implemented using a variety of physical media.

In FIG. 1, Node 110 is illustrated as an example of a general purpose computer that embodies the present invention. Node 110 illustrates seven basic components which a general purpose computer contains: a display 111, a CPU 112, a mass storage 113, a main memory 114, an input device 115, a network interface 116, and an internal bus 117. Those skilled in the art will appreciate that a general purpose computer which embodies the present invention may contain variations of these components, including more or less components. For example, a computer may contain additional components such as secondary memory or a communications device such as a modem, and a stand-alone computer system may not contain a network interface. In addition, multiple instantiations of each component type may be present in a computer. For example, a computer may contain multiple CPUs, multiple input devices including a keyboard, a mouse, and a scanner, and multiple types of mass storage including a hard drive, a floppy drive, a Digital Video Disk (DVD), a CD-Recordable device, a magneto-optical drive, etc. A computer may also have multiple internal buses, some of which may possess slots for removable bus cards which provide various functionality. Node 130 also consists of the seven basic described computer components, and will not be described in detail here. Those skilled in the art will appreciate that while only the network interfaces, such as network interface 116, are shown exchanging data with the network, other components in a computer, such as mass storage 113, may exchange data with the network through a network interface.

In node 110, the main memory 114 is illustrated having various main memory components such as an operating system 151, a plurality of application programs such as application program 153 and application program 155, computer data 157, and a TurboCopy program 160. The operating system 151 controls the interactions of the computer components through the use of the internal bus 117, and provides computer system services to other software programs. The application programs can invoke computer system services through interactions with operating system 151, and can access computer data 157. The TurboCopy program 160 can invoke computer system services through interactions with operating system 151, and provides the features of the present invention through its execution on node 110. Those skilled in the art will appreciate that the main memory components displayed will also interact with other computer components in the normal course of computer operation. For example, software programs such as operating system 151, the application programs, and TurboCopy program 160 will execute on CPU 112, are likely to have results displayed on display 111, may be permanently stored on mass storage 113, may receive input from input device 115, and may interact with other network nodes through network interface 116. Computer data such as data 157 may be displayed on display 111, may be used by CPU 112, and may be permanently stored on mass storage 113. In one embodiment, TurboCopy program 160 may accelerate data copying only if either the source or destination storage medium of the data is part of node 110, such as mass storage 113 or main memory 114, while in another embodiment TurboCopy program 160 may accelerate copying without this restriction. Those skilled in the art will also appreciate that other components may be present in main memory 114, including additional computer data components.

TurboCopy device 170 illustrates that the present invention can be embodied as a special-purpose hardware device providing the features of the present invention through its operation. TurboCopy device 170 works independently of TurboCopy program 160, and those skilled in the art will appreciate that only one of these components is necessary to embody the present invention.

Figure 2:
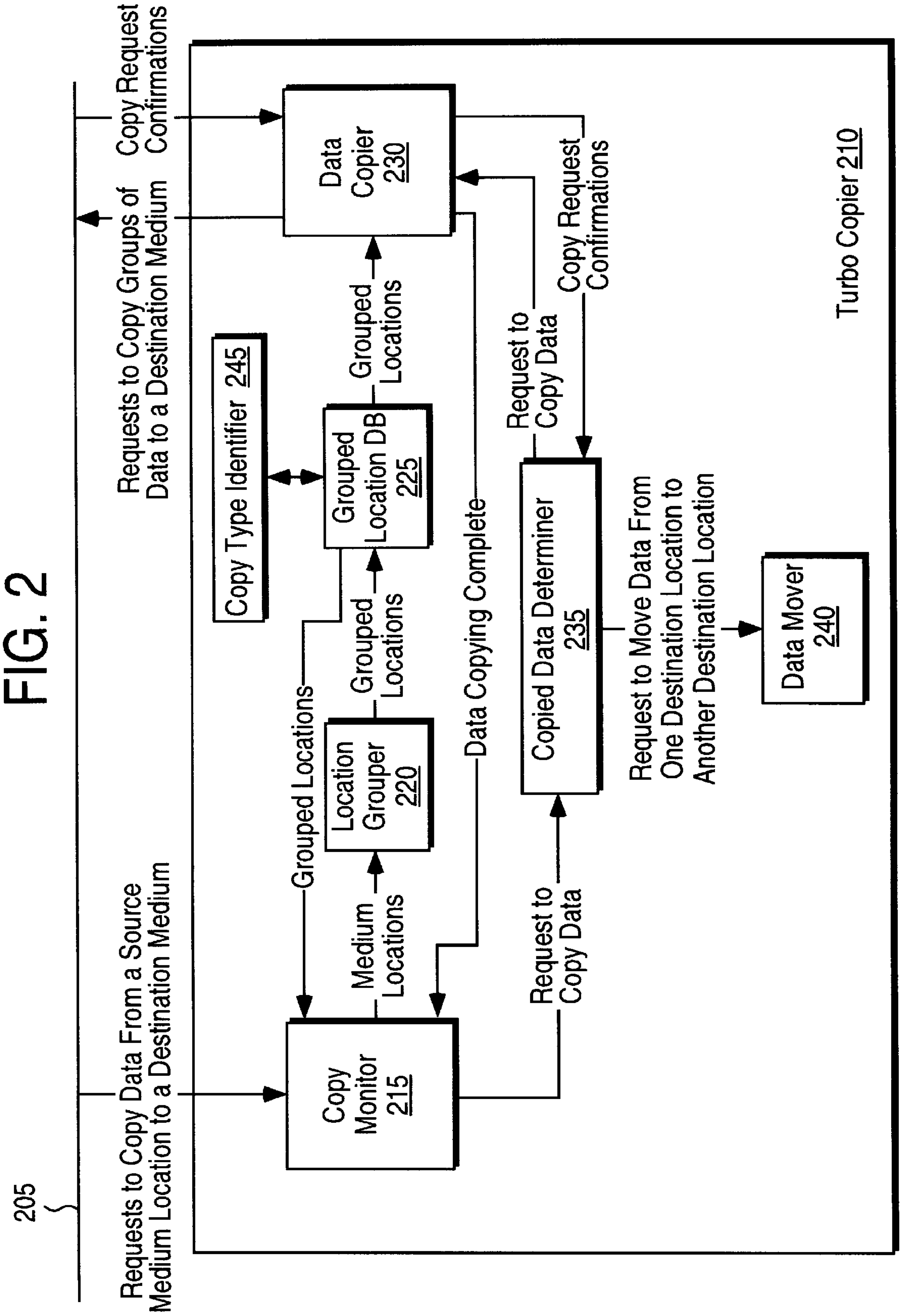
FIG. 2 illustrates a detailed block diagram of a TurboCopier in accordance with the present invention.

FIG. 2 illustrates a detailed block diagram of a TurboCopier, one embodiment of the present invention. The illustrated diagram includes a TurboCopier 210 and an information source 205 that is external to TurboCopier 210. The external information source 205 can correspond to any of a variety of informational sources, including an operating system, an application program, a database on a mass storage medium, a computer network, an internal computer bus, etc. The TurboCopier 210 illustrates an embodiment of the present invention that can represent either software running on a general purpose computer such as TurboCopy program 160 or a special-purpose hardware device such as TurboCopy device 170. FIGS. 4–13 will illustrate one specific embodiment of the invention in greater detail.

In FIG. 2, TurboCopier 210 illustrates seven TurboCopier components: a Copy Monitor 215, a Location Grouper 220, a Grouped Location Database (DB) 225, a Data Copier 230, a Copied Data Determiner 235, a Data Mover 240, and a Copy Type Identifier 245. The Grouped Location DB 225 can contain groups of source computer data storage medium locations that have previously been stored by Location Grouper 220, as well as destination mediums or destination medium locations to which the data from the source medium locations have been previously copied. The medium locations in the Grouped Location DB 225 are grouped together because they hold data whose copying can be accelerated, and groups can be specified as datasets. Types of data to be accelerated can be identified in various ways, such as all data copied between a particular source medium and particular destination medium, all data copied of a particular type (such as digital images or compressed digital audio), all data copied during a particular period of computer system operation (such as the boot phase), etc. Thus, a dataset identifies a type or group of data whose copying can be accelerated. After datasets are formed, the Grouped Location DB 225 informs the Copy Type Identifier 245 of the current or possible datasets.

The Copy Type Identifier 245 begins a particular copying acceleration by identifying a dataset of repetitively copied data to be accelerated, and informing the Grouped Location DB 225 of the identified dataset. The Grouped Location DB 225 then verifies whether it currently has grouped medium locations stored and available for the identified dataset. The Grouped Location DB 225 informs the Data Copier 230 and the Copy Monitor 215 of the dataset identified and whether grouped medium locations are available for the dataset, and sends the grouped medium locations for the identified dataset to the Data Copier 230 if they are available.

After receiving grouped medium locations for the identified dataset from the Grouped Location DB 225, the Data Copier 230 requests that for each group of source medium locations in the dataset, the data stored at the group of source locations be copied together as a group to a specified destination medium. The destination medium specified by the Data Copier 230 should be chosen to anticipate actual data copying that will be requested in the normal operation of one or more computer systems, and to minimize the amount of copying and the amount of time required for such copying when it is requested. If all data could be immediately copied to the destination mediums that will be designated by the later actual copy requests, then it is possible that no later copying will be required. However, even if a specified destination medium is different from a later actual destination medium, later copying may still be minimized—for example, if the later actual destination medium is the lowest level of RAM on a computer system, the specified destination medium is the next lowest level of RAM on the same computer system, and the one or more source mediums are network mass storage devices, then the later actual copying should be much faster to the lowest level of RAM from the second lowest level of RAM than it would have been from the mass storage devices. If all of the grouped source medium locations represent prior data copying to a single destination medium, then that destination medium would be the normal choice for the specified destination medium, since the most likely destination for a later repetitive copy would be to the same destination medium.

If the correct destination mediums that will be designated by the later actual copy requests are identified, not only can the time for later copying be minimized, but the time for total copying can be minimized. As described earlier, it can often be more efficient to copy groups of data together rather than each individual piece of data separately, particularly if the groups of data are chosen so that group copying of data is efficient. These efficiencies can arise both because of the physical characteristics of storage mediums, and because of the maximum transfer rates of buses and networks that will be carrying the data. Thus, copy acceleration can occur in multiple ways.

The form of the copying request used by Data Copier 230 can vary. FIG. 2 illustrates that Data Copier 230 sends copy requests to external information source 205. As described above, external information source 205 can correspond to various information sources, and the form of the copy request will vary depending on the particular information source. For example, if source 205 is an operating system, a copy request might be accomplished by invoking an executable function provided by the operating system for performing data copies. If source 205 is a database, a copy request might take the form of a database command. If there is some other program that controls the copying of data, the copy request may take the form of a message sent to that program, whether locally or over a network.

The level of detail in a copying request can also vary. In one embodiment of the invention, Data Copier 230 merely requests that the data be copied to a specified destination medium, and relies on some other component to store the requested information in appropriate destination medium storage locations (such as locations not currently in use). In another embodiment of the invention, Data Copier 230 identifies from the received grouped medium locations the destination medium storage locations to which data was previously copied, and requests that the data be copied to those specific destination medium storage locations. In yet another embodiment of the invention, Data Copier 230 identifies available locations on a specified destination storage medium, and requests that the data be copied to those identified destination medium storage locations.

After requesting data copies, Data Copier 230 receives copy request confirmations that indicate whether the data was successfully copied. The copy request confirmations typically come from external information source 205, and as with the form of the copying request, the form of the copy request confirmation can vary depending on the particular information source 205. For example, if source 205 is an operating system, a request confirmation might be a status code returned from an executable function that was invoked. These confirmations could arrive synchronously or asynchronously relative to the corresponding request. If there is some other program that controls the copying of data, the request confirmation could take the form of a message sent to Data Copier 230, whether locally or over a network. The information in the copy request confirmation can also vary with the level of detail in the copy request. If the copy request indicated a specific destination storage medium location, the confirmation might be a single bit indicating a successful completed copy or not. If the copy request merely indicated a specified destination medium, the confirmation would typically indicate the destination medium locations to which the data was stored. Another form of confirmation occurs if Data Copier 230 does not make a copy request—in that case, Data Copier 230 may presume that the data was not copied. A failure to make a copy request may occur for a variety of reasons, such as if the source or destination mediums are temporarily not available, or if Data Copier 230 cannot identify available destination medium locations to which the data can be copied. Data Copier 230 forwards copy request confirmations to Copied Data Determiner 235, and informs Copy Monitor 215 when all data copying that is possible is completed.

Upon receiving a notification from Data Copier 230 that all data copying is completed for the identified dataset, or upon receiving notification from Grouped Location DB 225 that grouped medium locations are not available for the identified dataset, Copy Monitor 215 begins to monitor data copy requests from external information source 205. This monitoring will attempt to identify the one or more source medium locations from which data is copied and the one or more destination medium locations to which data is copied, for each copy request corresponding to the identified dataset. If some monitored copy requests do not correspond to the identified dataset, Copy Monitor 215 will typically ignore the copy request. In addition, Copy Monitor 215 will typically be able to identify when the copy requests associated with the identified dataset are completed so that monitoring can cease. In an alternate embodiment, Copy Monitor 215 does not receive notification from Grouped Location DB 225 or Data Copier 230, but instead monitors copy requests continually, identifies patterns of repeated data, and creates its own datasets.

Copy Monitor 215 will generally monitor copy requests in such a manner that it can prevent the copy request from being executed if desired. This could be accomplished in various ways, such as by preventing the copy request from continuing to propagate and thus reaching the entity responsible for performing the copying, by overriding the copy request with an instruction not to copy the requested data, by preventing access to the source or destination mediums, etc. In one embodiment of the invention, Copy Monitor 215 will prevent execution of the copy request if Copy Monitor 215 had previously received a message from Data Copier 230 indicating that all data copying is completed for the identified dataset, since the requested data may already be available on the destination medium. In another embodiment of the invention, Copy Monitor 215 will allow execution of the copy request if Copy Monitor 215 had previously received a message from Grouped Location DB 225 informing that grouped medium locations are not available for the identified dataset, since Data Copier 230 would not have copied any data without available grouped medium locations.

The form of copy requests, copy request monitoring and copy request execution prevention will vary depending on the particular information source 205. It is also possible that the form of copy request monitored by Copy Monitor 215 will differ from the form of copy request used by Data Copier 230. As described above, external information source 205 can correspond to various information sources. If copy requests occur by invoking an executable copy function provided by the operating system, Copy Monitor 215 could provide for notification upon invocation of the copy function. For example, if the operating system provides a notification function, Copy Monitor 215 could request notifications upon invocation of the copy function. Alternately, Copy Monitor 215 could alter or replace the copy function in such a manner that attempted invocations of the function would provide notification. One method of performing a function replacement is by loading an alternate function into RAM so that it is executable, and replacing the executable RAM address of the copy function with the executable RAM address of the replacement function. In this manner, an attempted invocation of the copy function will actually invoke the replacement function. Other methods of providing notification upon function invocation, including other methods of altering or replacing executable functions, vary with different computer systems and operating systems, and are known and appreciated by those skilled in the art. A function alteration or replacement as described above can provide control over the execution of the original copy function, thus allowing copy request execution prevention if desired. Other methods of copy request monitoring and copy request execution prevention also vary with different computer systems and operating systems, and are known and appreciated by those skilled in the art.

Regardless of the form of the copy request or copy request monitoring, Copy Monitor 215 will attempt to identify the one or more source medium locations from which data is copied, and the one or more destination medium locations to which data is copied. Copy Monitor 215 will then forward the identified medium locations to Location Grouper 220. In addition, Copy Monitor 215 will forward the data copy requests to Copied Data Determiner 235.

Upon receipt of data copy requests, Copied Data Determiner 235 will compare the requests to the earlier received copy request confirmations, and will determine if the data copy request has already been accomplished through the earlier actions of Data Copier 230 (i.e., if the requested data is already present at the destination specified by the request). If the request is already accomplished, and Copy Monitor 215 had prevented the execution of the copy request, Copied Data Determiner 235 can either do nothing or can issue a copy request confirmation for the prevented copy request. If the request is already accomplished, and Copy Monitor 215 had not prevented the execution of the copy request, Copied Data Determiner 235 again can either do nothing or can issue a copy request confirmation for the prevented copy request, but issuing the confirmation will allow immediate action to be taken by others waiting for the availability of the data. If the request is not already accomplished, and Copy Monitor 215 had prevented the execution of the copy request, Copied Data Determiner 235 can reinstate the data copy request by sending the request to Data Copier 230, who will attempt to fulfill the copy request. If the request is not already accomplished, and Copy Monitor 215 had not prevented the execution of the copy request, Copied Data Determiner 235 can merely do nothing or can forward the request to Data Copier 230 (this would be advantageous if there was some reason that Data Copier 230 could fulfill the request more rapidly or successfully than the normal copy request execution routine).

It is also possible that Copied Data Determiner 235 determines that although the data copy request had not already been accomplished through the earlier actions of Data Copier 230, those earlier actions would allow for easier or more rapid fulfillment of the copy request. For example, it is possible that Data Copier 230 had previously copied the requested data to the destination medium, but not to the requested destination medium location. If it is faster or otherwise advantageous to execute an intra-destination medium copy (from one destination medium location to another) rather than a copy to the destination medium from another medium (as will often be the case), then Copied Data Determiner 235 will send to Data Mover 240 a request to move the requested data from its current destination medium location to the requested destination medium location. If it is not the case that intra-destination medium copies are faster, then Copied Data Determiner 235 can merely allow the original copy data request to be fulfilled, or it can reinstate a prevented request as described above. Another possibility is that Data Copier 230 had previously copied the requested data to a medium different from the destination medium, but that copying the data from this medium to the destination medium location is faster or more advantageous than copying the data from the original source medium. If this is the case, Copied Data Determiner 235 will send to Data Copier 230 a request to copy the requested data from the more advantageous medium to the destination medium. If this is not the case, then Copied Data Determiner 235 can again merely allow the original copy data request to be fulfilled, or it can reinstate a prevented request as described above. In some embodiments, data copying or data moving additionally involves the use of error checking routines to ensure that the data copying or moving operation is performed successfully. In addition, a data moving operation may further confirm before moving data that even if the data at the current destination medium was originally placed there without error, that the data has not been changed in the meantime.

As mentioned above, Copy Monitor 215 will forward identified medium locations to Location Grouper 220. It is often possible to group data copy requests together in such a manner that copying the entire group of data is more efficient that copying each piece of data in the group separately. Location Grouper 220 will attempt to group the identified source medium locations in such a manner. Moreover, it is often the case that it is faster to copy an entire group of data than to copy only a portion of the individual pieces of data in the group separately. For example, consider the case of copying data from a magnetic disk as described earlier, when a current copy request asks for the data stored at the first sector on a track on a platter and the data stored at the fourth sector on the track (i.e., three sectors after the first sector). It is possible to copy the data from the first sector as the read/write head passes over the sector, do nothing as the read/write head passes over the next two sectors, and then copy the data from the fourth sector as the read/write head passes over that sector. On the other hand, it is also possible to copy the data from the second and third sectors as the read/write head passes over them, even though that data was not currently requested. Since the rotation speed of the platter is constant and the data transfer rate will typically allow the data to be transferred as fast as it is copied, such additional copying will not delay reading data from the fourth sector. If the data from the second and third sectors is not copied, and the next copy request asks for data from the third sector, then that copying will have to wait until the platter completes almost an entire rotation so that the third sector is under the read/write head again. This is one example of how copying less data can take longer than copying more data that is grouped efficiently. Those skilled in the art will appreciate that grouping efficiencies can arise in many other situations.

When Location Grouper 220 receives identified medium locations, it can either group the locations as it receives them, or it can store all the locations for a particular dataset and group them at a single time. In either case, Location Grouper 220 will group the source medium locations in such a manner that loading a group together will be as efficient or more efficient than loading the data from each of the requests separately. The methods of grouping locations will vary with the type of source medium locations. The effect of the physical characteristics of a magnetic disk on copy efficiency were discussed above (such as platter rotation and arm movement), and other storage medium have other characteristics that will be appreciated by those skilled in the art. For example, a purely linear medium such as magnetic tape will impose a significant time penalty if individual copy requests occur at tape locations that are widely separated and large amounts of backtracking are required (such as reading the first location on the tape, then reading the last location, then rewinding all the way back to read the third location, then reading another location near the end of the tape, . . . ). In addition, the methods of grouping locations can vary with particular source mediums, even of the same type. It is possible for Copy Monitor 215 to additionally monitor the copy performance characteristics of particular storage mediums and to relay this information to Location Grouper 220. These characteristics could be monitored in either a passive fashion (such as watching for messages or information related to copy performance characteristics) or an active fashion (such as executing tests or making queries to identify information related to copy performance characteristics). This medium-specific information can be used in grouping locations.

Finally, the Location Grouper 220 can identify situations in which it is as efficient or more efficient to copy data from source locations not identified in any copy requests. When dealing with media that have linear access (i.e., to get from location one to location three it is necessary to pass location two), it is often efficient to group two locations by selecting a range of locations that encompass the two locations (for example, having the two locations be the endpoints of the range). Thus, if locations one and three are identified, it may be efficient to select the range of locations from one to three as a group. If there is no. penalty in the amount of time required to copy data for unidentified intermediate locations (such as location two), and the amount of destination medium space available to which the data will be copied is not limited, it generally makes sense to copy the additional data. Given the typical situation of imperfect predictions, it generally is beneficial to copy additional data when there is no time penalty since the data might actually be requested despite a prediction to the contrary. If prediction is perfect, however, copying the data from location two will not be useful since it will never be requested and it will consume available space on the destination medium. Thus, a trade-off must typically be made between amount of destination medium space available, accuracy of prediction, and amount of time required to copy unidentified data.

After Location Grouper 220 has grouped the identified source medium locations into groups for efficient loading, it sends the grouped locations to Grouped Location DB 225. As previously discussed, the Grouped Location DB 225 stores the grouped locations and specifies the grouped locations as a dataset, and informs the Copy Type Identifier 245 of the availability of the dataset.

As discussed above, there are various alternate embodiments of the invention as described. Those skilled in the art will appreciate that TurboCopier 210 can have fewer or additional components. In particular, a single component could perform the tasks described as being performed by more than one component, or could perform some but not all of the tasks of several components. Alternately, what is described as a single component could be broken up into multiple components. Furthermore, additional components could be present that provide additional functionality. The invention could also be embodied in a form that performs only some of the tasks described. For example, an embodiment that performed only monitoring might not have components such as Data Copier 230, Copied Data Determiner 235 and Data Mover 240. In the same manner, a copying embodiment might not possess a separate monitoring functionality, and thus might not have a component such as Location Grouper 220. Those skilled in the art will appreciate that other combinations of functionalities are possible.

Figure 3:
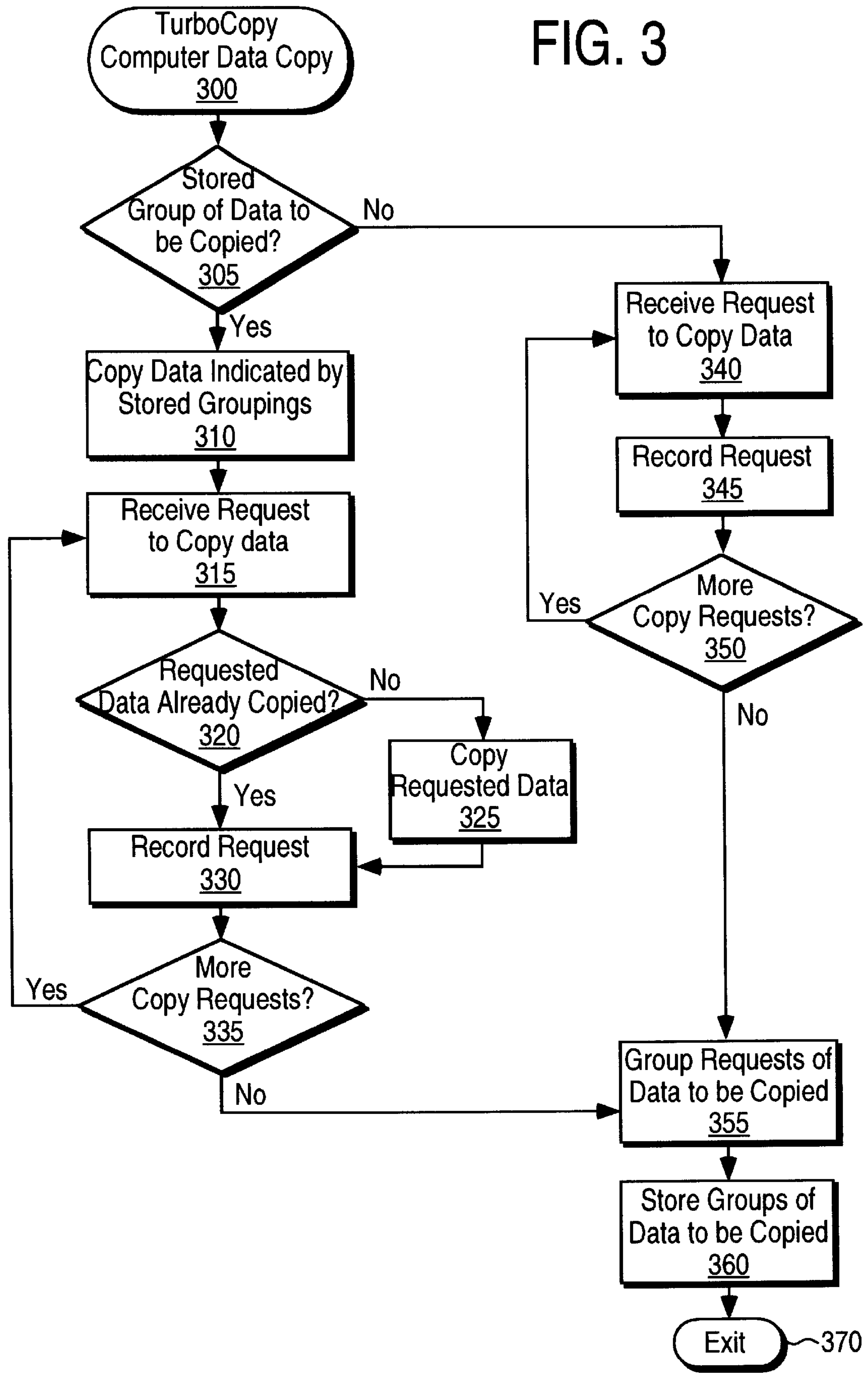
FIG. 3 illustrates a flow diagram for the TurboCopy Computer Data Copy process in accordance with the present invention.

FIG. 3 illustrates the high-level general flow diagram for the operation of a TurboCopier 210. The TurboCopy Computer Data Copy 300 routine begins at step 305 by checking whether groups of data corresponding to a particular dataset are stored and available. As described above, a group of data identifies one or more items of data that will be treated similarly. If data to be copied is available for the dataset, the routine proceeds to copy the data indicated by the stored groupings in step 310 if possible. The data to be copied is identified in a manner relative to the particular source medium. For example, if the source medium is a magnetic disk, the data to be copied may be identified by a particular source medium location, such as a particular sector. If the data is stored in a database, the data to be copied may be identified by a database data tag or indicator. In the same manner, a group of such data is identified relative to a particular source medium. For the magnetic disk, a group of data could be a single sector, a range of sectors, or several unrelated sectors. For a database, a group could be identified with a single database tag where the database treats the data as a group, or a group could be several unrelated database tags. Those skilled in the art will appreciate that various means are available for identifying data and groups of data to be copied. In addition, a stored group of data will indicate the destination medium to which the data is to be copied, and may indicate a particular location on the destination medium or a manner in which the data is to be copied. Step 310 will copy all indicated data that it can, but various circumstances may prevent some copying. For example, if the source or destination mediums are unavailable, or if there is not space available on the destination medium, step 310 cannot copy that data.

After the indicated data is copied, the routine proceeds to receive a request to copy data that corresponds to the current dataset in step 315. There are various ways to identify if a request corresponds to the current dataset. For example, all requests for a certain period of time or until an event occurs may be treated as part of the same dataset, all requests to copy data from a particular source medium may be treated as part of the same dataset, the copy requests themselves may identify the dataset to which they belong, etc. Those skilled in the art will appreciate that if multiple datasets are used, the datasets must be selected in a manner that allows identification of whether a copy request corresponds to a dataset. If a copy request does not correspond to the current dataset, it is ignored. Like the stored groupings mentioned above, the form of the copy request will vary with the particular source medium. In addition, some embodiments may prevent a copy request from being fulfilled, while others will not. Methods of preventing copy request execution are described earlier in relation to TurboCopier 210.

After receiving a copy request corresponding to the current dataset, the routine proceeds to step 320 to determine if the copy request is already fulfilled. A copy request will be fulfilled if the data requested is present at the requested destination in an error-free form. This will typically be done by determining if the requested data was copied to the requested destination in step 310 in an error-free manner, and if so, determining that the data at the requested destination has not been changed. It is also possible that the data will be at the requested destination for reasons not resulting from copying performed in step 310. The determination of whether the requested data was copied in step 310 can normally be done by comparing the identification of the requested data to be copied with the identifications of the data that was copied in step 310. If a particular piece of data can be identified in multiple ways, however, the determination is more difficult. If the requested data was copied in step 310, it must next be determined if the requested destination is the same as destination to which the data was copied in step 310. If so, and if the data at the destination location remains error-free, then the copy request is already fulfilled.

If the copy request is not fulfilled, the routine proceeds to fulfill the request in step 325. If the copy request was prevented from being executed in step 315, then step 325 must be the one to fulfill the request, while if the copy request was not prevented, step 325 can choose to fulfill the request itself or allow the normal mechanism for copy request execution to fulfill the request. If step 325 fulfills the request, it can be done in a variety of ways. As described earlier, if the requested data is already present on the destination medium, then step 325 can move or copy the data from that location rather than from the original requested source location. If the requested data is present on a medium that is different from the destination medium and source medium, but from which it is more convenient to copy the data than from the source medium, step 325 can arrange to copy the requested data from that other medium. If the requested data is only available on the source medium, or if it is more convenient to copy the data from the source medium, step 325 can merely execute the original copy request.

After the copy request is fulfilled in step 325, or if the copy request was already fulfilled in step 330, the routine proceeds to record the copy request in step 330. The routine then proceeds to determine in step 335 if there are more copy requests or if there will be more requests for the current dataset. If so, the routine returns to step 315 to receive additional copy requests. If not, the routine proceeds to step 355 to group requests of data to be copied together. The requests that will be grouped are those that were previously recorded. As described earlier, a grouping of data to be copied identifies one or more items of data that will be treated similarly. In addition, in order to facilitate later copy accelerating, the grouping must be done in a manner that will provide for efficient copying. The manner of this grouping will vary with the types of source mediums and with other factors. In addition, it may be more efficient to group data to be copied in such a way that extra data that was not requested is also copied. For example, on a medium with linear access, it may be more efficient to copy data from a range of locations even if some of the data in the range was not requested. When copying from a database, it may be more efficient to copy a group as defined by the database that includes data that was not requested rather than copy each individual piece of data separately. Thus, as described above, a trade-off must typically be made between amount of destination medium space available, accuracy of prediction, and amount of time required to copy unidentified data.

After grouping the requests in step 355, the routine proceeds to store the groups of data to be copied in step 360.

If multiple datasets exist, the stored groups are designated as a particular dataset. These stored groups provide copying information that can be used in later operations of the invention, and are accessed in step 305.

If data to be copied is not available for the dataset in step 305, the routine proceeds instead to step 340 to receive a request to copy data that corresponds to the current dataset. This step operates in a similar fashion to step 315 described above. However, an embodiment will not typically prevent a copy request from being fulfilled in step 340 since the embodiment has not taken separate steps to execute the requested copying. Nonetheless, some embodiments may prevent the execution of copy requests in step 340 in the same manner as in 315. After receiving a copy request corresponding to the current dataset, the routine proceeds to record the copy request in step 345 in a manner similar to that of step 330. The routine then determines in step 350 if there are more copy requests or if there will be more requests for the current dataset. If so, the routine returns to step 340 to receive additional copy requests. If not, the routine proceeds to step 355 to group requests of data to be copied together, as described above.

Finally, after groups of data to be copied are stored in step 360, the routine exits at step 370. Those skilled in the art will appreciate that the 300 routine can later be reinvoked on a periodic basis or if there are additional datasets to be monitored or for which to have copying accelerated. Also, as was earlier mentioned, TurboCopier 210 can have fewer or additional components than those shown in FIG. 2. If the invention is embodied in a form that performs only some of the tasks described, such as only doing monitoring or not having a separate monitoring functionality, some of the corresponding steps illustrated in FIG. 3 may not be used.

The following references to FIGS. 4–13 will describe the processing flow for one embodiment of invention, referred to as the illustrated embodiment. This embodiment will describe in greater detail the operation of the invention in accelerating the loading of data into RAM during the startup, or boot phase, of a computer system. Those skilled in the art will appreciate that specific illustrative details are added here that are not required in every embodiment related to loading data during booting. As discussed earlier, operating systems often allow other third parties to write software that extends or modifies the basic functionality of the operating system. It is typical for numerous small operating system extensions to be installed by the user, and loaded after the basic operating system functionality has been loaded. Since each system extension acts as a small software program that is itself loaded and that potentially loads a set of non-executable data, this repetitive loading of data during computer boot can be accelerated. In the illustrated embodiment, the data will be loaded from a magnetic disk source medium.

Figure 4:
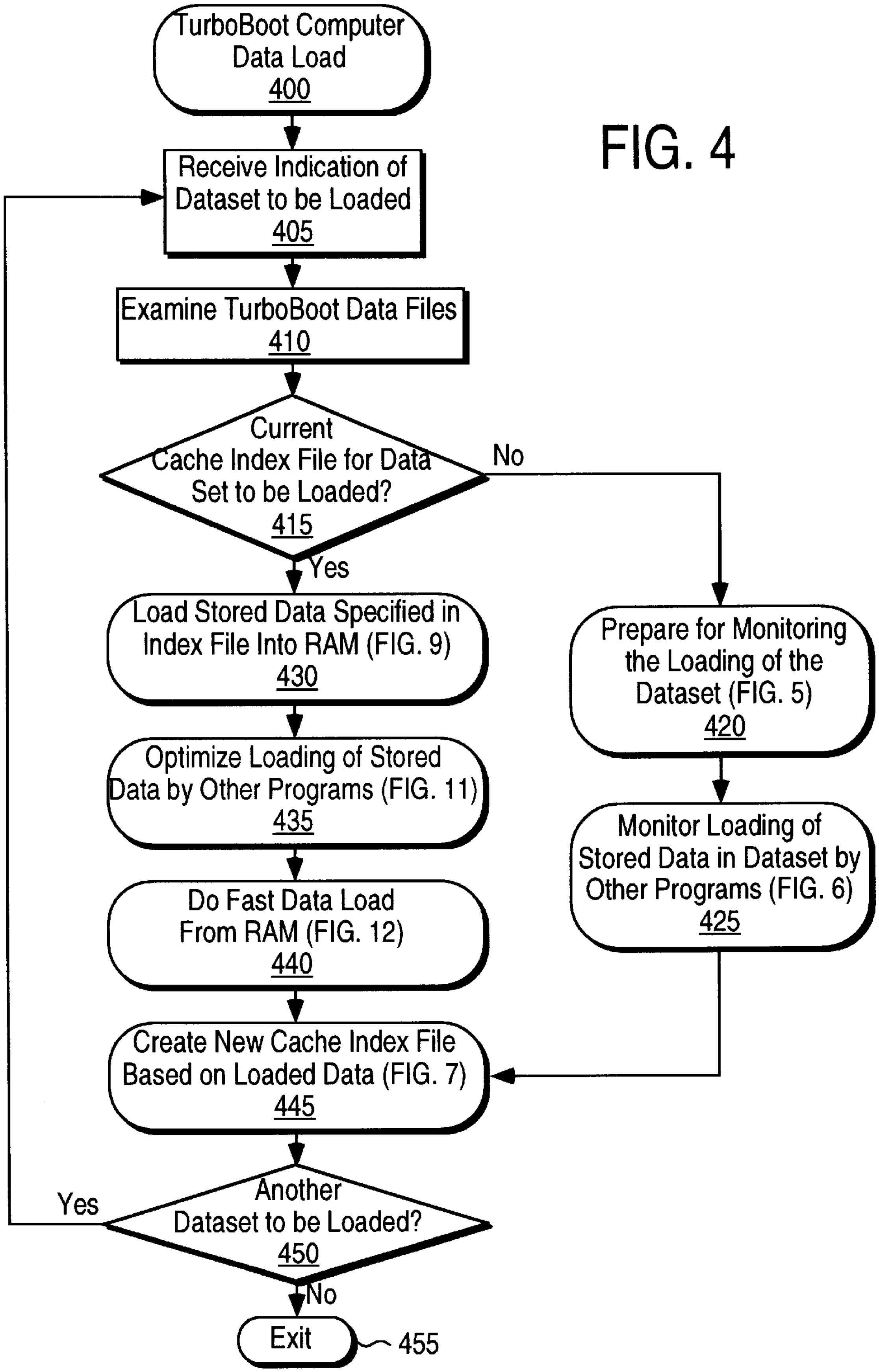
FIG. 4 illustrates a flow diagram for the TurboBoot Computer Data Load process in accordance with the illustrated embodiment of the present invention.

FIG. 4 illustrates the general flow diagram for the TurboBoot Computer Data Load 400 routine. The 400 routine begins at step 405 by receiving an indication of a particular dataset to be loaded into RAM during the computer boot. If only one dataset corresponds to loading during computer boot, that dataset could be used automatically. After identifying the dataset to be used, the routine examines the TurboBoot data files in step 410 to determine in step 415 if a current cache index file is stored and available for the dataset to be loaded. Many computer programs store execution-related data, such as user preference information or information on the program options installed, in program data files in one or more specified areas on the mass storage medium where the program is installed. In this illustrated embodiment, datasets are stored in one such data file, referred to here as cache index files. The cache index files could be a part of existing data files, or they could be additional files in such a specified area. Thus, checking for a current cache index file is one method of checking whether groups of data corresponding to the identified dataset are stored and available.

Figure 9:
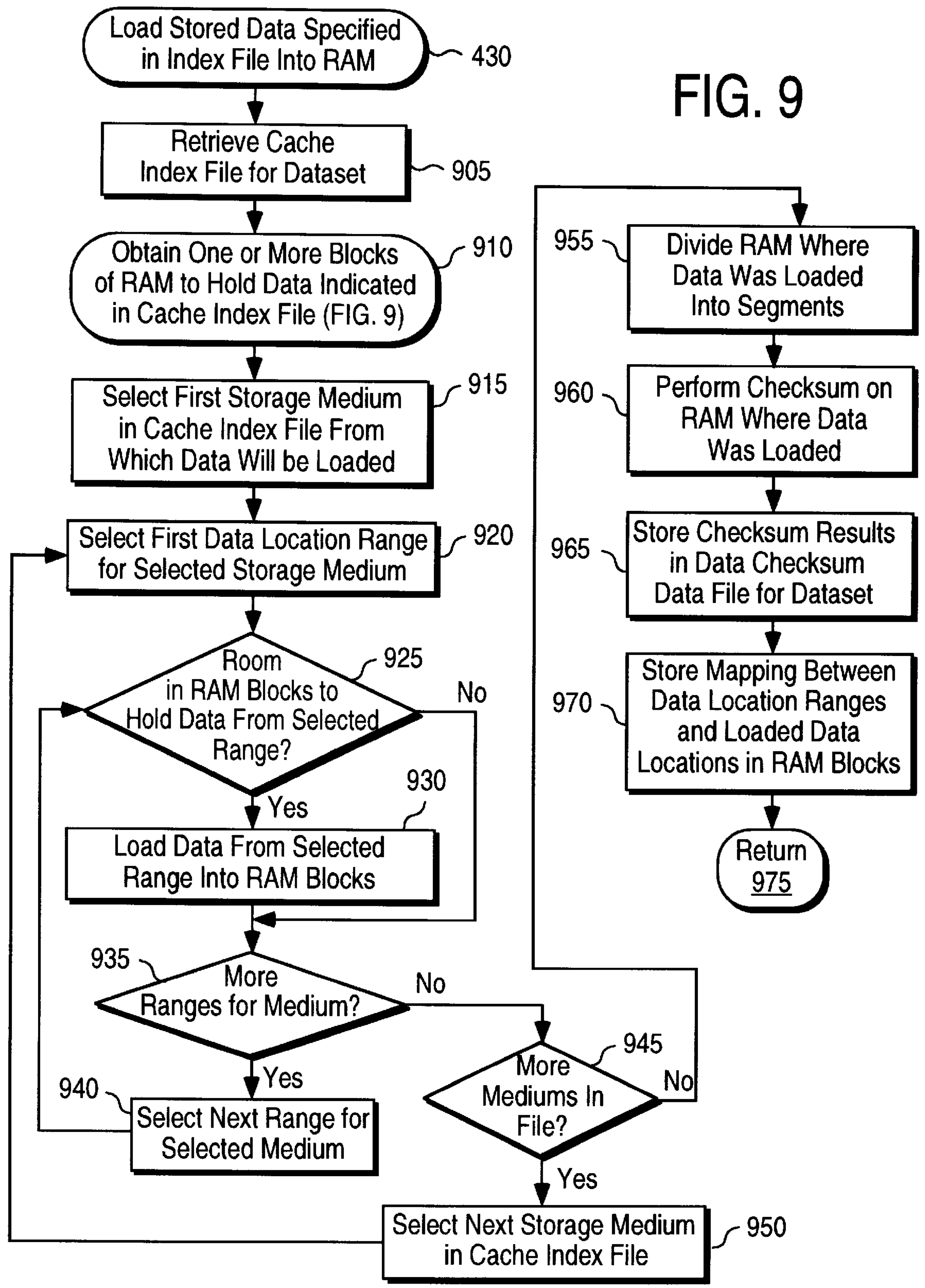
FIG. 9 illustrates a flow diagram for the Load Stored Data Specified In Index File Into RAM process in accordance with the illustrated embodiment of the present invention.

If a cache index file is available for the identified dataset, the routine proceeds to the Load Stored Data Specified In Index File Into RAM subroutine in step 430, which is described further with respect to FIG. 9, and executes the subroutine. Execution of the 430 subroutine will load the data into RAM if possible. After execution of the subroutine in step 430, the routine proceeds to return to step 435 to execute the Optimize Loading Of Stored Data By Other Programs subroutine, which is described further with respect to FIG. 11. Execution of the 435 subroutine will take the steps necessary to allow monitoring of later data load requests. After execution of the subroutine in step 435, the routine proceeds to return to step 440 to execute the Do Fast Data Load From RAM subroutine, which is described further with respect to FIG. 12. Execution of the 440 subroutine will monitor the later data load requests and ensure that they are fulfilled, as well as record load request information. After execution of the subroutine in step 440, the routine proceeds to return to step 445 to execute the Create New Cache Index File Based On Loaded Data subroutine, which is described further with respect to FIG. 7. Execution of the 445 subroutine will create a new cache index file based On the monitoring done in step 440 or step 425 and the resulting recorded information.

Figure 5:
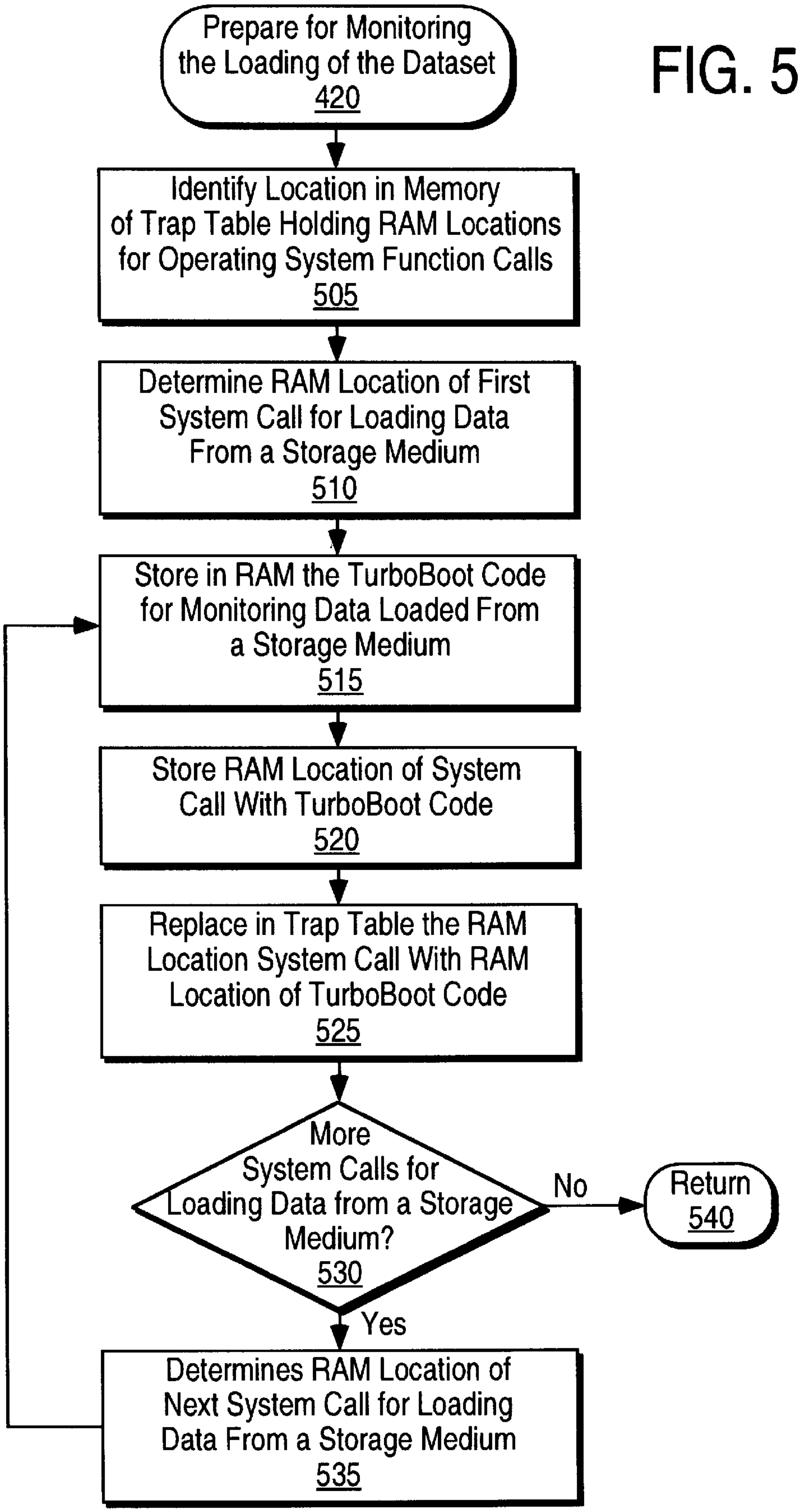
FIG. 5 illustrates a flow diagram for the Prepare For Monitoring The Loading Of The Dataset process in accordance with the illustrated embodiment of the present invention.

Alternately, if a cache index file is not available for the identified dataset in step 415, the routine proceeds to the Prepare For Monitoring The Loading Of The Dataset subroutine in step 420, which is described further with respect to FIG. 5, and executes the subroutine. Execution of the 420 subroutine will take the steps necessary to allow monitoring of later data load requests in a manner similar to step 43 5. After execution of the subroutine in step 420, the routine proceeds to return to step 425 to execute the Monitor Loading Of Stored Data In Dataset By Other Programs subroutine, which is described further with respect to FIG. 6. Execution of the 425 subroutine will monitor the later data load requests and record load request information. After execution of the subroutine in step 425, the routine proceeds to step 445 to execute the Create New Cache Index File Based On Loaded Data subroutine, which is described further with respect to FIG. 7.

After execution of the subroutine in step 445, the routine proceeds to return to step 450 to determine if there are additional datasets to be loaded. This may be true if datasets are grouped based on the source medium from which the data is loaded, and there is data to be loaded into RAM during boot from multiple source mediums. If there is another dataset to be loaded, the routine returns to step 405 to receive an indication of the next dataset to be loaded. If there is not another dataset to be loaded, the routine exits at step 455. Those skilled in the art will appreciate that the 400 routine can later be reinvoked on a periodic basis or if there are additional datasets to be monitored or for which to have loading into RAM during boot accelerated.

Referring now to FIG. 5, the general flow diagram for the Prepare For Monitoring The Loading Of The Dataset subroutine 420 is described. In the illustrated embodiment, data load requests are accomplished by software programs through the use of an executable function provided by the operating system. There may be one function to load data into RAM from any source medium, or there may be multiple functions for loading data into RAM with different capabilities. In addition, the mechanism provided by .the operating system for invoking such a function is referred to as a trap table. When the core portion of the operating system is loaded into RAM at the beginning of the boot process, these executable functions provided by the operating system are loaded into RAM such that each function has a memory address used to invoke the function. The trap table is a set of specified locations that will store the memory addresses for the provided functions. When a computer program invokes a function provided by the operating system, the memory address stored at the trap table location for that function is retrieved, and the function located at that memory address is executed.

The preparation for load request monitoring begins at step 505 by identifying the RAM location of the trap table that holds the memory addresses of operating system functions or subroutines. After identifying the trap table location, the subroutine proceeds to step 510 to determine the specific location in the trap table for the first operating system function call that can be used to load data into RAM from some other storage medium, and selects that operating system function call as the current function. The subroutine next proceeds to step 515 where TurboBoot code for monitoring data load requests is loaded into RAM, thus providing a memory address that can be used to execute this TurboBoot code. There may be a single group of TurboBoot code for monitoring all data load requests, or there may be different groups of code that vary with the different operating system calls to load data into RAM. The subroutine then proceeds to step 520 where the memory address that is stored in the trap table location for the current operating system function is recorded. The subroutine next proceeds to step 525 where the memory address for the TurboBoot code loaded in step 515 is inserted into the trap table location for the current operating system function, thus replacing the previous memory address with the TurboBoot code address. Thus, an attempted invocation of the operating system function call by another program will now invoke the TurboBoot code loaded in step 515 instead. The subroutine next determines at step 530 if there are more operating system function calls for loading data into RAM from a storage medium. If there are more functions, the subroutine proceeds to step 535 to determine the specific location in the trap table for the next operating system function call and to select that operating system function call as the current function, and then returns to step 515. If there are not more functions, the subroutine proceeds to step 540 which ends the subroutine and returns to the flow from which the subroutine was executed. Those skilled in the art will appreciate that this is only one way to monitor for data load requests, and the invention is not limited to this particular method.

Figure 6:
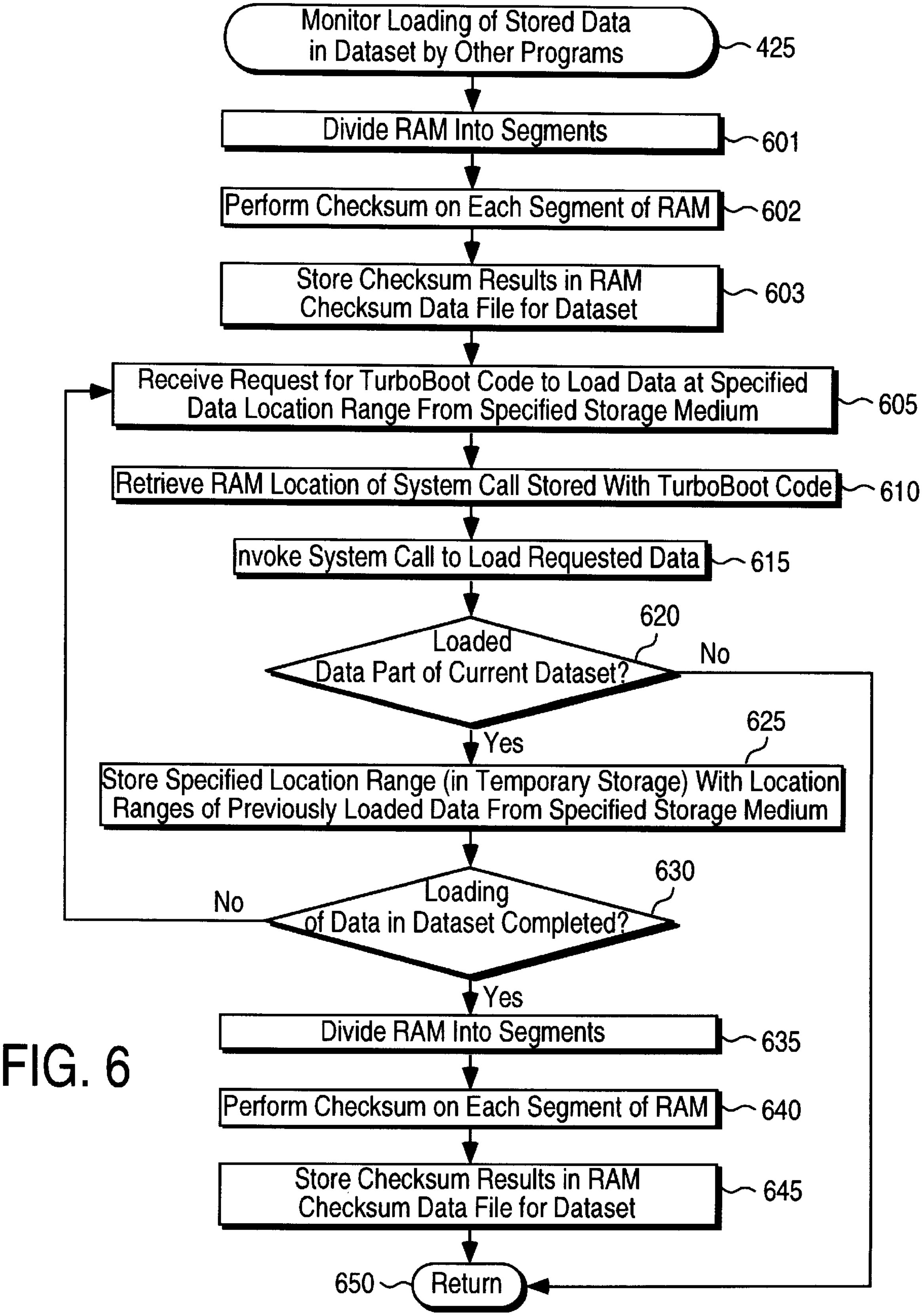
FIG. 6 illustrates a flow diagram for the Monitor Loading Of Stored Data In Dataset By Other Programs process in accordance with the illustrated embodiment of the present invention.

Referring now to FIG. 6, the general flow diagram for the Monitor Loading Of Stored Data In Dataset By Other Programs subroutine 425 is described. The monitoring of data load requests begins at step 601 where the RAM is divided into segments, then to step 602 where a checksum is performed on each segment, and then to step 603 where the checksum results are stored in a TurboBoot RAM checksum data file. These steps are done to solve a problem not shared by other embodiments. While this subroutine is merely monitoring data load requests and using an operating system provided function to load data, another part of the embodiment will load the data in the dataset before the data is requested. However, because this data loading occurs while the operating system itself is being loaded, it is possible that the operating system will not yet provide the functionality to reserve parts of RAM for use by TurboBoot into which the data can be loaded. If the operating system does not provide the RAM, then TurboBoot must identify available RAM itself While some operating systems might allow TurboBoot to identify available RAM and designate that RAM as in use and thus no longer available, not all operating systems will do so. Thus, if the illustrated embodiment is executing on a computer system without these functionalities, TurboBoot must identify RAM that will not be used by the operating system or any other program until TurboBoot no longer needs the RAM, which will be when the loading of the dataset is complete and there are no more load requests corresponding to the dataset. A checksum is one method of determining if the contents of RAM have changed from one time to another. By performing a checksum now and storing the results, and performing another checksum when the loading of the dataset is complete, TurboBoot can identify those portions of RAM which have been altered (and thus are in use) between the two checksums (thus during the loading of data for the dataset). If the RAM has not been altered, then it is likely that it will remain available for use by TurboBoot in the future when TurboBoot loads data before data load requests for the dataset are received. Those skilled in the art will appreciate that other methods exist for monitoring the use and availability of RAM and could be used here instead of a checksum approach.

The monitoring of data load requests continues at step 605 when TurboBoot monitoring code, previously loaded in step 515 of FIG. 5, receives a request to load data. This request will specify one or more specific source medium locations from which to load data—in the case of a magnetic disk source medium, the request will specify one or more sectors from which to load data. The subroutine next proceeds to step 610 to retrieve the memory address that was recorded in step 520 of FIG. 5, which was the memory address that was previously stored in the trap table location for the operating system function corresponding to the TurboBoot monitoring code that received the request in step 605. After retrieving the memory address, the subroutine proceeds to step 615 and invokes the memory address to load the requested data, passing to the function being invoked the same information received by the TurboBoot code in step 605. The retrieved memory address should correspond to the desired operating system function unless some other third party had already replaced the memory address in the trap table before the address was recorded in step 520, and if it does correspond, the data load request will proceed in the same manner that it would have without the intervention of TurboBoot with only a slight delay. The subroutine then determines in step 620 if the data load request corresponds to the current dataset, and if it does not, the subroutine proceeds to step 650. If there is only one dataset for the entire boot process, then the data load request will correspond to the dataset until an indication is received that the boot process is completed. Other methods for determining if the data load request corresponds were discussed earlier, and will not be repeated here. If the data load request does correspond to the dataset, the subroutine proceeds to step 625 where the source and destination medium information specified in the data load request are temporarily stored. The stored information will be grouped such that requests from a particular source medium can be loaded together efficiently. The grouping can either be done incrementally as each request is received, or at a single time after all requests for the dataset have been received. This illustrated embodiment will perform the grouping in the 445 subroutine described in FIG. 7, after all requests have been received.

After storing the data load request information, the subroutine determines in step 630 if the loading of data for the dataset is complete, and if it is not, the subroutine returns to step 605 to receive additional data load requests. As mentioned above, if there is only one dataset for the entire boot process, or if all datasets can continue to have load requests until the boot process is complete, then the end of the boot process will signal that all load requests have been received. Those skilled in the art will appreciate that there are various ways to determine when a dataset is completed, as well as various ways to determine when the boot process is completed, that vary with computer type and computer operating system. Some computer systems or operating systems may provide a notification when the boot process is complete. A specific example of detecting the completion of the boot process on a current Macintosh® computer running the Mac® operating system is that a computer program called the Finder is always loaded after the boot process is over, so the loading of the Finder can be monitored. In general, application programs will not be loaded until the boot process is completed, so the execution of any application program is another possible signal that the boot process is complete. If the loading of the dataset is completed, the subroutine proceeds to step 635 where the RAM is divided into the same segments as those of step 601, then proceeds to step 640 where a checksum is performed on each segment, and then to step 645 where the checksum results are stored in the same TurboBoot data file as was used in step 603. The TurboBoot data file in which the RAM checksum results are stored can be the cache index data file, or a separate data file. The subroutine then continues to step 650 which ends the subroutine and returns to the flow from which the subroutine was executed.

Figure 7:
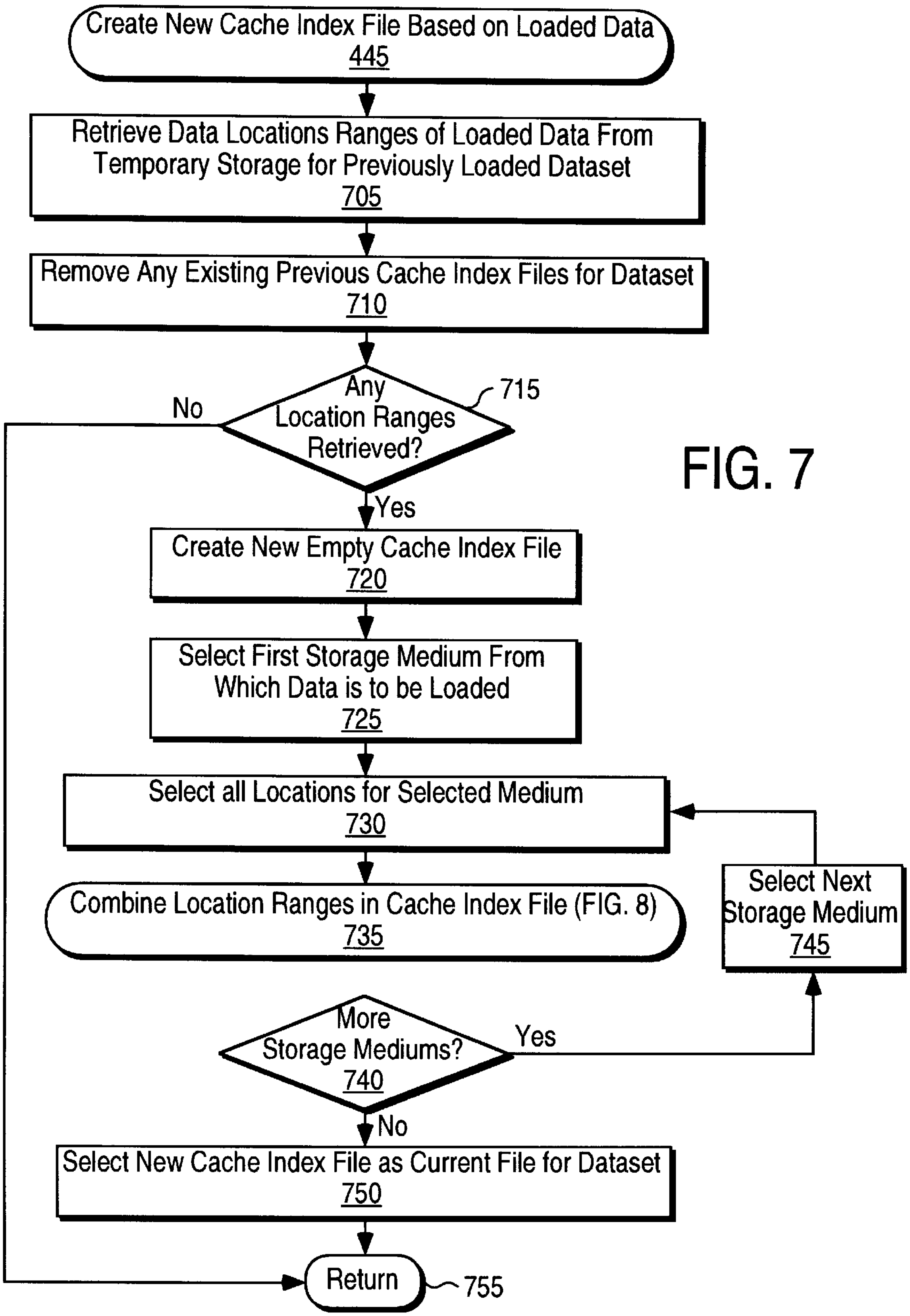
FIG. 7 illustrates a flow diagram for the Create New Cache Index File Based On Loaded Data process in accordance with the illustrated embodiment of the present invention.

Referring now to FIG. 7, the general flow diagram for the Create New Cache Index File Based On Loaded Data subroutine 445 is described. As described above, subroutine 445 groups the source and destination medium information for a particular dataset in such a manner that data requests from a particular source medium can be loaded together efficiently. Since the source medium in the illustrated embodiment is a magnetic disk, the source medium information will typically include individual sectors or ranges of sectors from which data was loaded. The grouping of the data to be loaded begins at step 705 where source and destination medium information for the data to be grouped is retrieved. This information was gathered by monitoring data load requests for the dataset, and temporarily storing the information until the loading of the dataset was complete. As described above, it is possible to group this information as it is received, or after the loading of the dataset is complete, and this illustrated embodiment groups the information after the loading of the dataset is complete. After the information is retrieved, the subroutine next removes any existing cache index file for the current dataset in step 710. The subroutine then determines in step 715 whether any source medium location information was retrieved from temporary storage (i.e., whether any load requests were detected for this dataset). If no location information was retrieved, the subroutine proceeds to step 755. In this situation, any previous cache index file for the dataset was removed even though a new dataset file will not be created. While alternate embodiments might remove a previous dataset file only if a new file is to be created, it is more typical to remove the old file in any situation since any information contained in it does not reflect the information gathered for the most recent loading of the dataset.

If some location information was retrieved, the subroutine proceeds to step 720 and creates a new empty cache index file for the current dataset. The subroutine next selects the first source storage medium from which data was loaded in step 725, and selects all source medium locations retrieved for that source medium in step 730. The subroutine then proceeds to execute the Combine Location Ranges In Cache Index File subroutine 735, which is described further with respect to FIG. 8. Execution of the 735 routine will group the source medium locations for the selected source storage medium in the new cache index file. After execution of the subroutine in step 735, the subroutine proceeds to determine in step 740 if there are more source storage mediums in the retrieved information. If there are more source mediums, the subroutine selects the next source medium in step 745 and returns to step 730. If there are not more source mediums, the subroutine proceeds to step 750 and designates the new cache index file as the cache index file for the current dataset. The subroutine then continues to step 755 which ends the subroutine and returns to the flow from which the subroutine was executed.

Figure 8:
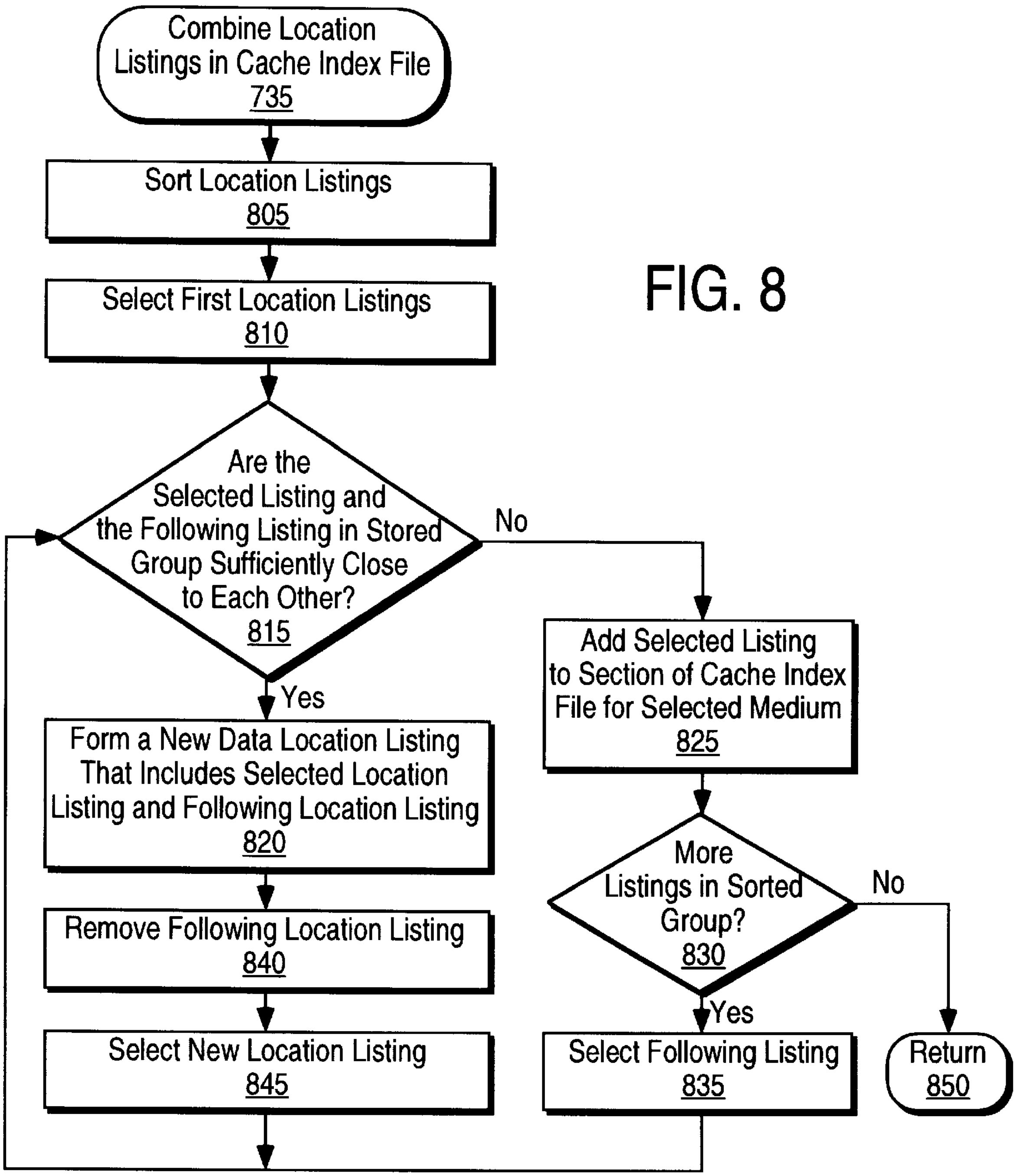
FIG. 8 illustrates a flow diagram for the Combine Location Ranges In Cache Index File process in accordance with the illustrated embodiment of the present invention.

Referring now to FIG. 8, the general flow diagram for the Combine Location Ranges In Cache Index File subroutine 735 is described. As described above, the methods of grouping locations will vary with the type of source medium. For media with linear access such as magnetic disks, it is typically efficient to load consecutive medium locations together as a group, and it is often as efficient or more efficient to load a range of locations as a group, even if some of the locations in the range did not have data loaded from them. Thus, the subroutine begins in step 805 by sorting the location listings so that for each listing, the closest locations from which data was copied will be the location listing before it and the location listing after it in the sorted list. It is possible that the medium locations were sorted as they were received and stored—in this case, no sorting will be required here. After the locations are sorted, the subroutine selects the first location listing from the sorted list in step 810. A location listing can be in various forms such as a single sector, or a range of sectors.

The subroutine next determines in step 815 if the selected location listing and the next location listing in the sorted list are sufficiently close to each other that they should be grouped together. The determination of sufficiently close locations can be accomplished in various ways. If at least one of the location listings is a range, the locations may overlap (i.e., listings of 1–4 and 3–6, or 4 and 4–6). Whether the location listings are ranges or individual locations, the next location listing may be immediately after the first location (i.e., 1–4 and 5–6, or 4 and 5–6). In situations of overlap or consecutive locations, the illustrated embodiment will always group the locations with a range of locations that includes all locations (i.e., 1–6, 4–6, 1–6 and 4–6 in the four previous examples, respectively). If the location listings are not consecutive or overlapping, then a determination still must be made whether the locations are sufficiently close. The value can be determined in a number of ways, such as a fixed value that was determined earlier for this type of source medium either empirically or on the basis of a theoretical or physical model, a fixed value that is determined by monitoring the performance of this particular source medium and calculating the value or adjusting the previously determined fixed value, a fixed value that was set by the user, a fixed value calculated on the basis of the size of the destination medium, a variable value that is adjusted based on the changing amount of available space on the destination medium, a value that is calculated by weighing the relative importance of factors such as speed of transfer and available destination space, etc. Those skilled in the art will appreciate that the value can be calculated in a variety of ways, and that some embodiments will only group locations that are consecutive or that overlap.

If the selected location listing and the next location listing are not sufficiently close, the subroutine proceeds to step 825 where the selected location listing is added to the new cache index file as a group (whether the listing is a single sector or range of sectors). The subroutine then determines in step 830 if there are more than one location listing left in the sorted list, and if there is not, the last location listing is added to the new cache index file as a group of locations and the subroutine continues to step 850 which ends the subroutine and returns to the flow from which the subroutine was executed. If there is more than one location listing left in the sorted list, the selected listing is removed from the front of the sorted list and what was the next listing is now selected, and the subroutine returns to step 815. Alternately, if the selected location listing and next location listing are sufficiently close, the subroutine proceeds to step 820 where a new data location range is formed that includes the selected locations and next locations. Typically, the smallest range possible that includes the locations is chosen, but alternate embodiments may choose larger ranges if a larger range can lead to more efficient acceleration. The subroutine next proceeds to remove the selected location listing and the next location listing from the sorted list in step 840. The subroutine then in step 845 adds the newly formed data location range to the beginning of the sorted list, designates the newly formed range as the selected listing, and returns to step 815. In this manner, the subroutine continues through the sorted list, merging locations together into ranges until a range is chosen as a group that is added to the cache index file, and then continuing through the sorted list. As described above, subroutines 420, 425 and 445 described in FIGS. 5–8 indicate a portion of the embodiment where the loading of data during computer boot is monitored, but not actively accelerated. After the loading of data is once monitored, subsequent computer boots can then be accelerated.

Referring now to FIG. 9, the general flow diagram for the Load Stored Data Specified In Index File Into RAM subroutine 430 is described. In this portion of the embodiment, loading of data has been previously monitored at least once, and acceleration of loading will now take place. The accelerated loading of data begins in step 905 by retrieving the existing cache index file for the current dataset. As was just explained, the dataset contains groupings of data to be loaded together, and for a magnetic disk source medium in this illustrated embodiment, the groupings will either be individual sectors or ranges of sectors arranged in a sorted manner, with no overlaps in sectors. The subroutine next proceeds to execute the Obtain One Or More Blocks Of RAM To Hold Data Indicated In Cache Index File subroutine in step 910, which is described further with respect to FIG. 10, and executes the subroutine. Execution of the 910 subroutine will obtain RAM to which data can be loaded temporarily. After execution of the subroutine in step 910, the subroutine proceeds to return to step 915 to select the first storage medium from which data will be loaded in the cache index file. The subroutine then selects the first group of locations for the selected storage medium in step 920, and proceeds to determine in step 925 if there is room in the available RAM blocks obtained to hold the data from the selected group of locations. If there is room, the data is loaded from the selected locations into the obtained RAM blocks in step 930, and the subroutine proceeds to determine in step 935 if there are more grouped locations for the selected medium in the cache index file. If there is not room in step 925, the subroutine proceeds directly to step 935. If there are more locations in step 935, the subroutine selects the next groups of locations for the selected storage medium in step 940, and returns to step 925. If there are not more locations in step 935, the subroutine proceeds to determine in step 945 if there are more storage mediums from which to load data in the cache index file. If there are more mediums, the subroutine selects the next storage medium in step 950 and returns to step 920.

If there are not more mediums in step 945, the subroutine proceeds to step 955 where the obtained RAM into which data was loaded is divided into segments, and a checksum is performed on the segments in step 960. The checksum results are then stored in a data checksum data file for the current dataset in step 965. As described earlier, results could be stored in the cache index data file for the dataset, or in a separate data file. Finally, the RAM locations of the various loaded groups of locations are stored in step 970, and the subroutine continues to step 975 which ends the subroutine and returns to the flow from which the subroutine was executed. As described earlier, a checksum is one method of error-checking. While the checksums described earlier were used to locate available RAM, the checksums are used here to ensure that the data loaded into obtained RAM remains unchanged when it is used in the future. By performing a checksum just after loading the data, and another checksum just before using the data, the checksum results can be compared and it can be determined if the data has been changed since it was loaded. Those skilled in the art will appreciate that other error-checking methods are available for determining data integrity, and that the use of this method by the illustrated embodiment does not limit the invention to this particular data error-checking method.

Figure 10:
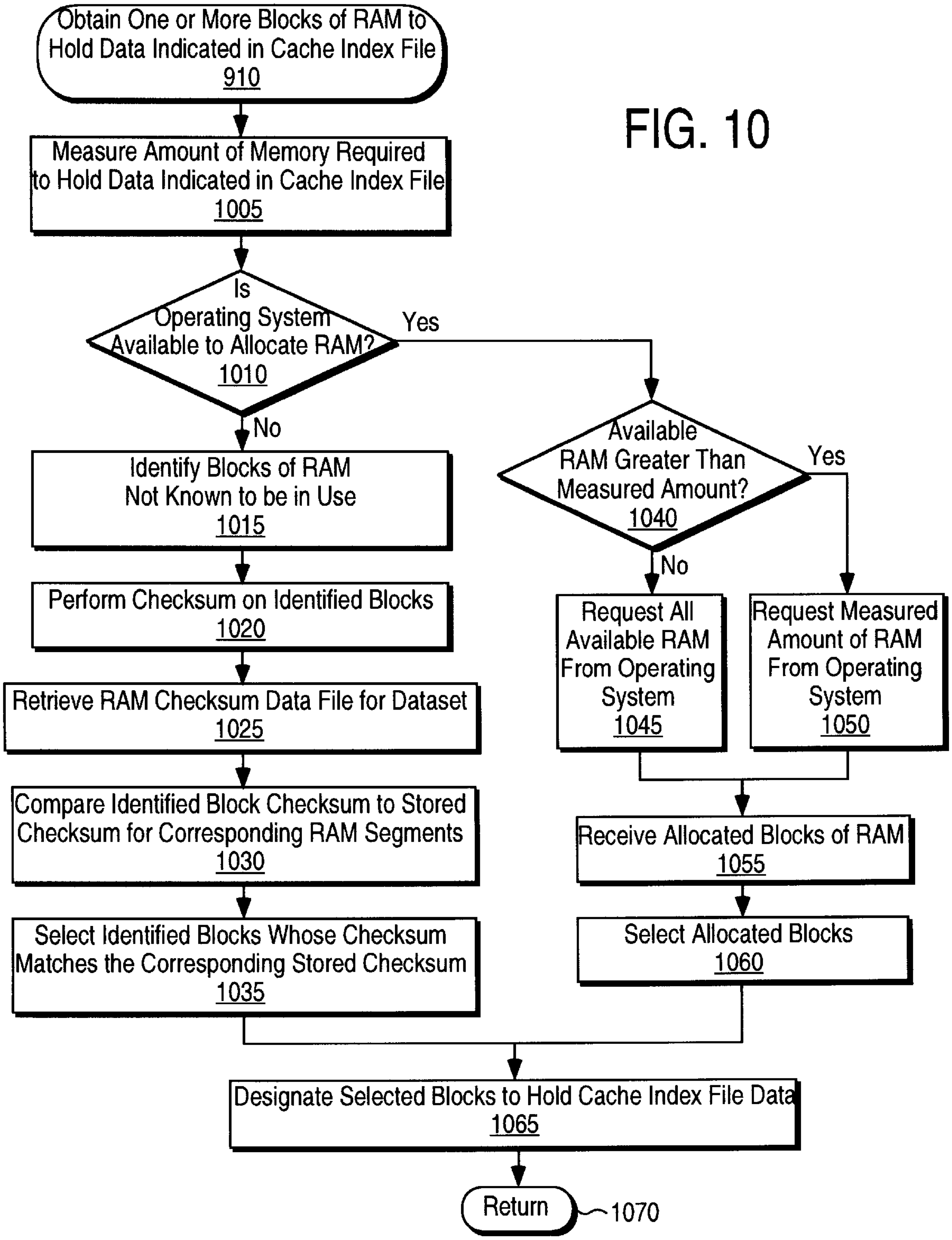
FIG. 10 illustrates a flow diagram for the Obtain One Or More Blocks Of RAM To Hold Data Indicated In Cache Index File process in accordance with the illustrated embodiment of the present invention.

Referring now to FIG. 10, the general flow diagram for the Obtain One Or More Blocks Of RAM To Hold Data Indicated In Cache Index File subroutine 910 is described. The potential problems with obtaining RAM in this embodiment were discussed earlier. The obtaining of RAM begins in step 1005 by measuring the amount of RAM required to hold the data in the grouped memory locations stored in the cache index file for the current dataset. Even if an exact amount of RAM cannot be determined, a close estimate is typically possible, as well as a ceiling on the total amount of RAM required. The subroutine then proceeds to determine in step 1010 if the operating system is available to allocate RAM. While operating systems generally perform this function, this embodiment will be executing before the operating system is fully loaded, and this operating system functionality may not be available. Another possibility, although unlikely, is that the operating system does not allocate blocks of RAM. If the operating system does allocate RAM, however, the subroutine proceeds to determine in step 1040 if there is an amount of RAM available that is at least as big as the measured amount from step 1005. If the amount available is as big, the subroutine then requests from the operating system the measured amount of RAM in step 1050, and if the amount available is not as big as the measured amount, the subroutine then requests from the operating system all available RAM in step 1045. In either case, the subroutine next proceeds to receive the allocated RAM in step 1055 and to select the allocated blocks in step 1060 before continuing on to step 1065.

If the operating system is not able to allocate RAM in step 1010, on the other hand, the subroutine then proceeds to step 1015 to identify blocks of RAM known to be in use. This identification will vary with computer system and operating system. On a current Macintosh computer running the MacOS operating system, for example, the operating system is known to use certain parts of RAM (called low memory to indicate its position), and to treat other parts of memory as a general purpose heap. Those skilled in the art will appreciate that other methods will be available on other computer systems to identify blocks of RAM known to be in use. After the blocks known to be in use are identified, the remaining blocks of RAM are identified as those blocks that are not known to be in use. The subroutine then performs in step 1020 a checksum on those blocks not known to be in use. The subroutine next retrieves in step 1025 the RAM checksum data file in which information was first stored in step 603 of FIG. 6. The various checksum results are then compared in 1030 for these blocks of RAM not known to be in use, and those blocks which do not appear for any reason to be in use (the checksum results are consistent) are then selected in step 1035. The subroutine then continues to step 1065, and those blocks which were selected in step 1035 or step 1060 are designated as the blocks of RAM obtained to hold data loaded from the cache index file. Finally, the subroutine continues to step 1070 which ends the subroutine and returns to the flow from which the subroutine was executed.

Figure 11:
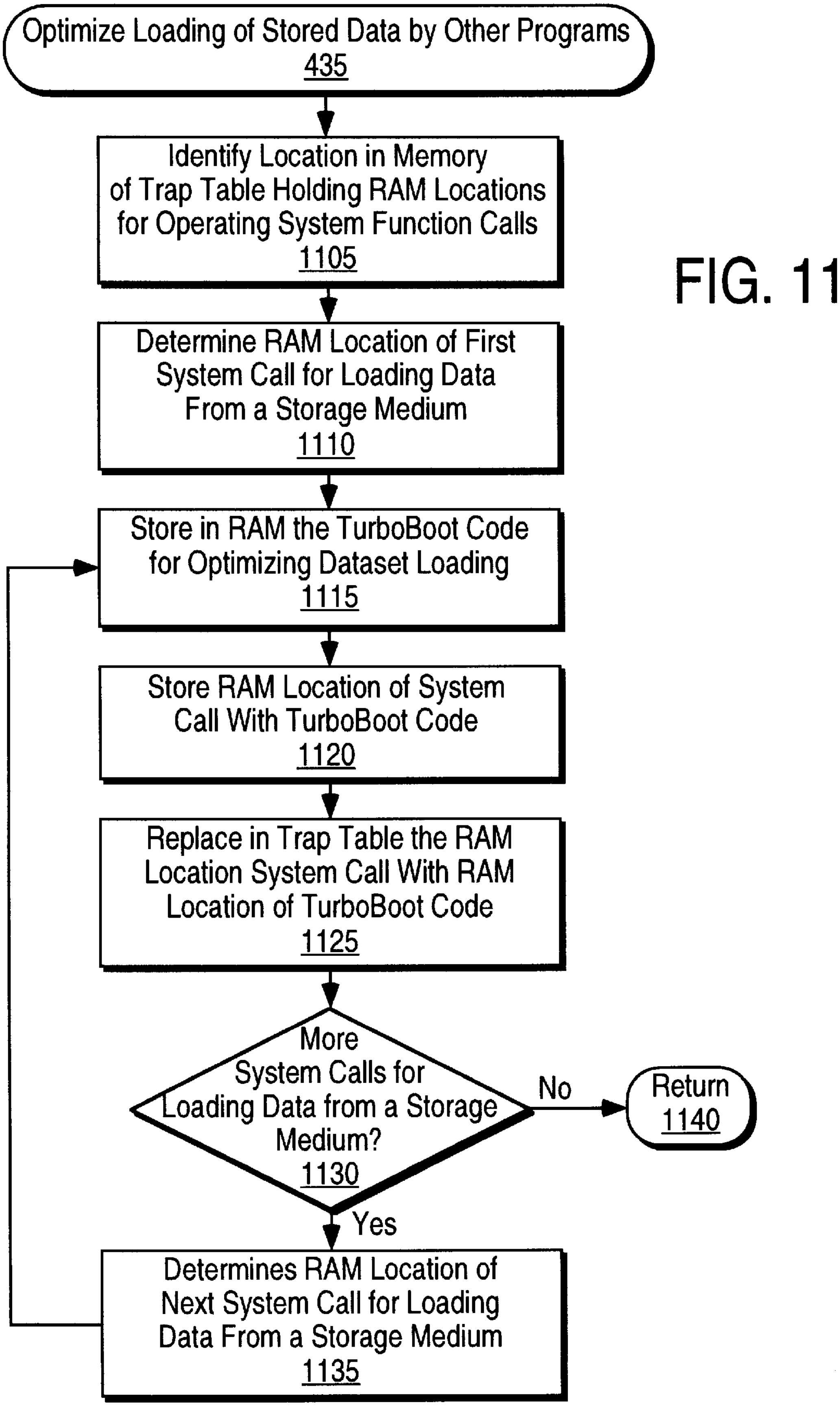
FIG. 11 illustrates a flow diagram for the Optimize Loading Of Stored Data By Other Programs process in accordance with the present invention.

Referring now to FIG. 11, the general flow diagram for the Optimize Loading Of Stored Data By Other Programs subroutine 435 is described. The operation of subroutine 435 is very similar to that of Prepare For Monitoring The Loading Of The Dataset subroutine 420, which was described above in FIG. 5. In the illustrated embodiment, data load requests are performed by software programs through the use of an executable function provided by the operating system, and the memory addresses for the provided functions are stored in the operating system trap table. The loading of stored data by other programs is optimized by monitoring the load requests, preventing the normal execution of the load requests, and optimizing the loading if possible.

The load request optimization begins at step 1105 by identifying the RAM location of the trap table that holds the memory addresses of operating system functions or subroutines. After identifying the trap table location, the subroutine proceeds to step 1110 to determine the specific location in the trap table for the first operating system function call that can be used to load data into RAM from some other storage medium, and selects that operating system function call as the current function. The subroutine next proceeds to step 1115 where TurboBoot code for optimizing data loading is loaded into RAM, thus providing a memory address that can be used to execute this TurboBoot code. There may be a single group of code for optimizing all data loading, or there may be different groups of code that vary with the different operating system calls to load data into RAM. The subroutine then proceeds to step 1120 where the memory address that is stored in the trap table location for the current operating system function is recorded. The subroutine next proceeds to step 1125 where the memory address for the TurboBoot code loaded in step 1115 is inserted into the trap table location for the current operating system function, thus replacing the previous memory address with the TurboBoot code address. Thus, an attempted invocation of the operating system function call by another program will now invoke the TurboBoot code loaded in step 1115 instead. The subroutine next determines at step 1130 if there are more operating system function calls for loading data into RAM from a storage medium. If there are more functions, the subroutine proceeds to step 1135 to determine the specific location in the trap table for the next operating system function call and to select that operating system function call as the current function, and then returns to step 1115. If there are not more functions, the subroutine proceeds to step 1140 which ends the subroutine and returns to the flow from which the subroutine was executed. Those skilled in the art will appreciate that this is only one way to identify data load requests, and the invention is not limited to this particular method.

Figure 12:
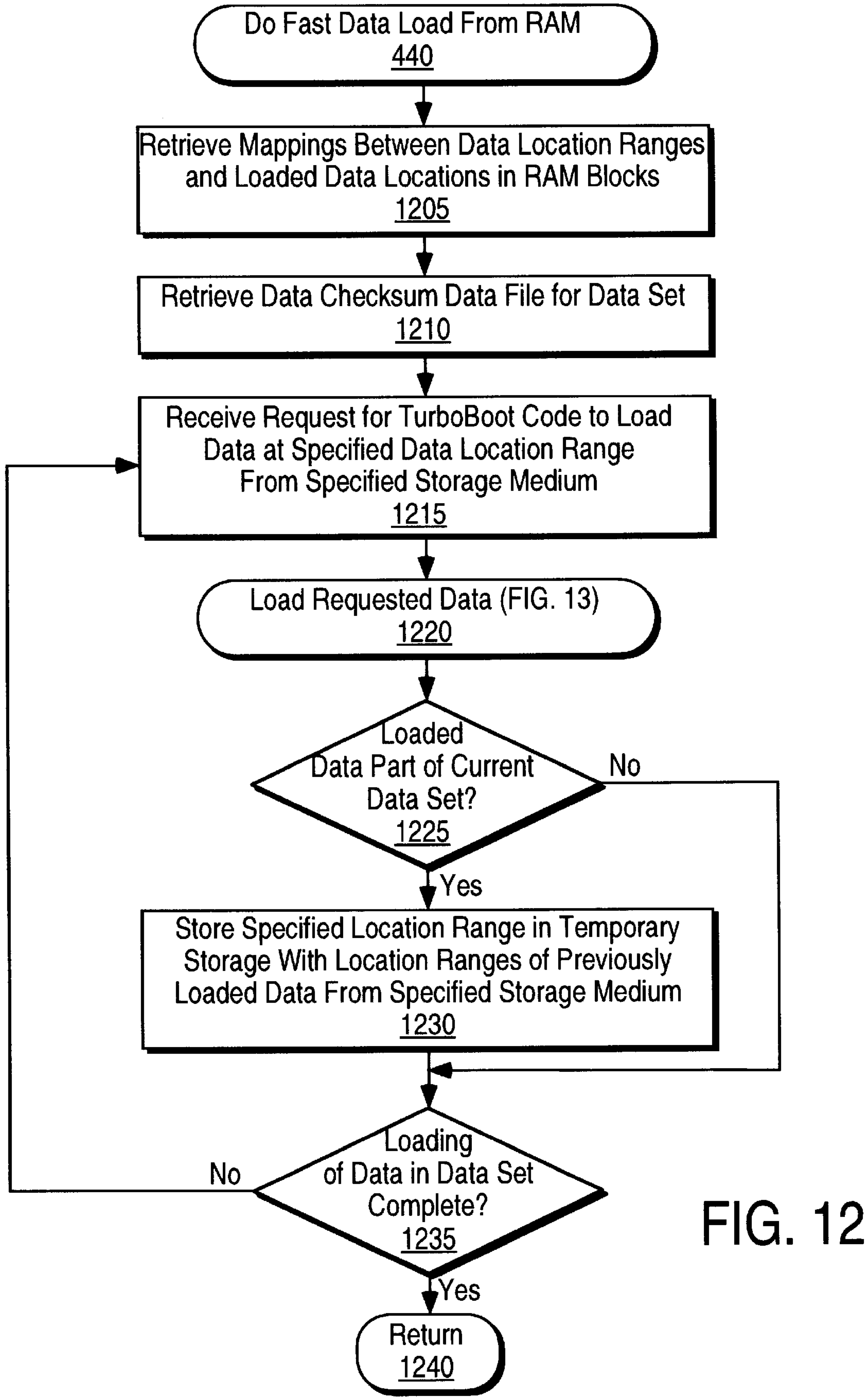
FIG. 12 illustrates a flow diagram for the Do Fast Data Load From RAM process in accordance with the illustrated embodiment of the present invention.

Referring now to FIG. 12, the general flow diagram for the Do Fast Data Load From RAM subroutine 440 is described. The fast data loading begins in step 1205 by retrieving the RAM locations of the loaded data that were stored in step 970 of FIG. 9. The subroutine then retrieves in step 1210 the data checksum data file for the current dataset that was stored in step 965 of FIG. 9. The subroutine then proceeds to step 1215 where TurboBoot optimizing code, previously loaded in step 1115 of FIG. 11, receives a request to load data. As described earlier, this request will specify one or more specific source medium locations from which to load data—in the case of a magnetic disk source medium, the request will specify one or more sectors from which to load data. The subroutine next proceeds to execute the Load Requested Data subroutine in step 1220, which is described further with respect to FIG. 13, and executes the subroutine. Execution of the 1220 subroutine will fulfill the data load request. After execution of the subroutine in step 1220, the subroutine proceeds to determine in step 1225 if the loaded data was part of the current dataset. If the data was part of the current dataset, the subroutine proceeds to step 1230 where the source and destination medium information specified in the data load request are temporarily stored. As described earlier, the stored information will be grouped such that requests from a particular source medium can be loaded together efficiently, and the illustrated embodiment will perform the grouping in the 445 subroutine described in FIG. 7 after all data load requests have been received. The subroutine then determines in step 1235 if the loading of data in the current dataset is complete, and if it is not, the subroutine returns to step 1215. If the data was not part of the current dataset in step 1225, the subroutine proceeds directly to step 1235 for the dataset completeness determination. Methods for determining if the loading of the dataset is complete have been discussed earlier, and will not be repeated here. If the loading of the dataset is complete in step 1235, the subroutine continues to step 1240 which ends the subroutine and returns to the flow from which the subroutine was executed.

Figure 13:
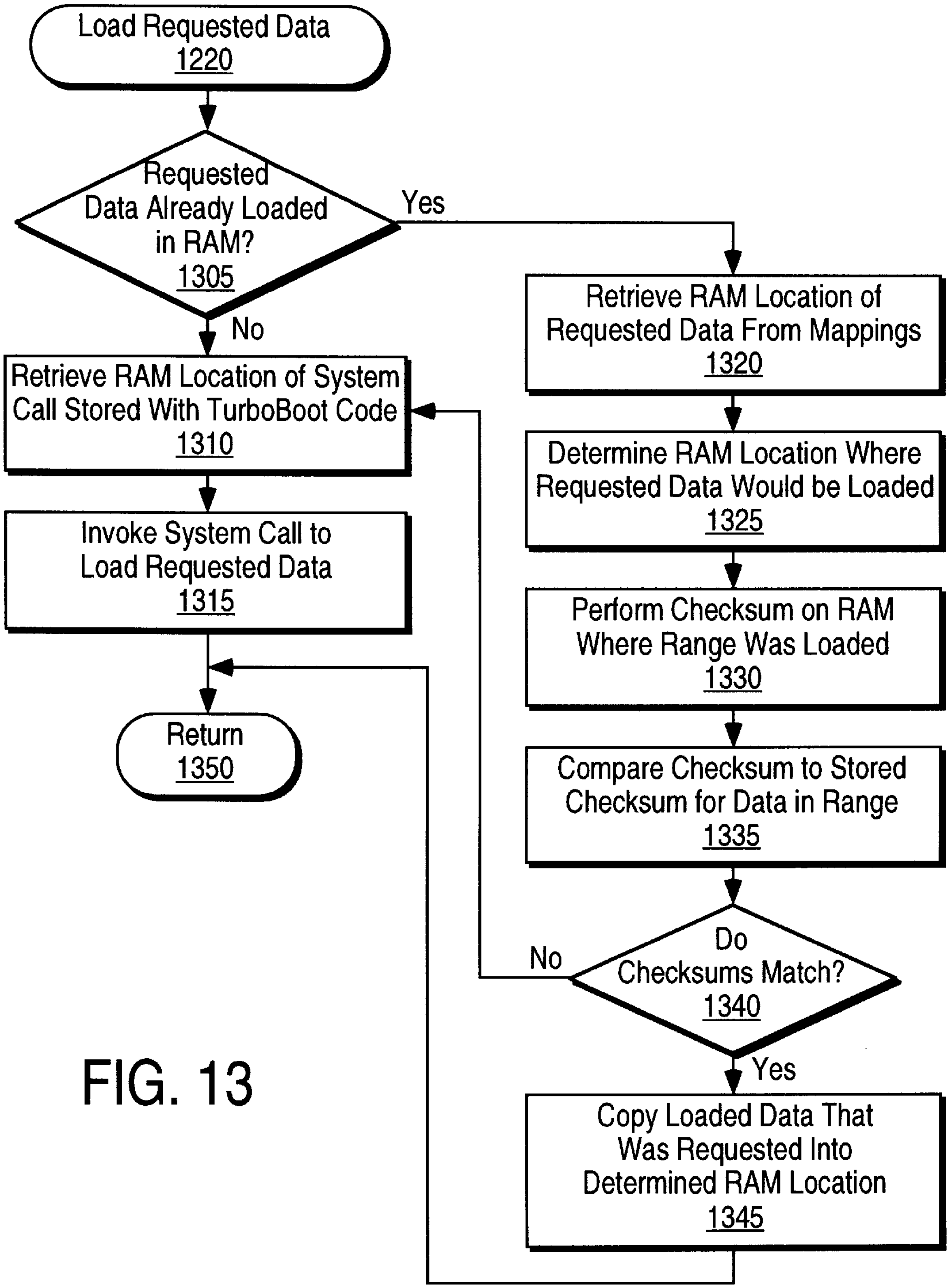
FIG. 13 illustrates a flow diagram for the Load Requested Data process in accordance with the illustrated embodiment of the present invention.

Referring now to FIG. 13, the general flow diagram for the Load Requested Data subroutine 1220 is described. The optimized loading begins in step 1305 by determining if the requested data was already loaded in RAM during step 930 of FIG. 9. Methods for determining this were described earlier and will not be repeated in detail here, but the RAM locations of the loaded data that were retrieved in step 1205 would typically be used in the determination. If the requested data is loaded in RAM, the subroutine proceeds to step 1320 and identifies the RAM location of the requested data by using the retrieved RAM locations. The subroutine then determines in step 1325 if the request to load data specifies a particular RAM location to which the data should be loaded, and if so, identifies that particular RAM location. The subroutine next performs in step 1330 a checksum on the area of RAM to which the requested data was loaded, and compares the checksum in step 1335 to the corresponding stored checksum that was performed in step 960 of FIG.

9. If the checksums indicate in step 1340 that the requested data in RAM has not been changed since it was loaded (i.e., that the checksums match), then the requested data is copied to the identified particular RAM location from the RAM location to which it was originally loaded. As described earlier, this copying should occur much more rapidly than loading the data into RAM from a mass storage device such as a magnetic disk. If the checksums indicate that the requested data in RAM has been changed in step 1340, or if the requested data was not already loaded in RAM in step 1305, the subroutine proceeds to step 1310 where the RAM memory address of the operating system function to load data, which was recorded from the trap table and then stored in step 1120 of FIG. 11, is retrieved. The subroutine in step 1315 then invokes the function using the retrieved memory address to load the requested data from the source medium. Thus, if the data was not originally loaded into RAM for some reason (such as there not being enough available room) or if the data was loaded but was altered after it was loaded (and thus lacks data integrity), the requested data will be loaded from the source medium to fulfill the data request. Otherwise, the data will be copied from its previous location in RAM to the destination requested by the data load request. Finally, the subroutine proceeds to step 1350 which ends the subroutine and returns to the flow from which the subroutine was executed.

Thus, in the illustrated embodiment, the acceleration of loading data occurs in two ways. It is clear that from the perspective of a single data load request during the acceleration phase, the loading of data occurs more quickly. Since most or all of the data that will be requested is already in RAM, the data can be copied to the request destination much more quickly than loading the data from a source medium like a magnetic disk. However, this speedup at the time of data request comes at the expense of the time spent earlier in obtaining available RAM, loading the data into the obtained RAM, and monitoring the data requests. Nonetheless, it is typically the case that the loading of data during the boot phase is accelerated in an absolute sense (i.e., the computer spends less total time in the boot phase), and typically by a significant degree. The speed increases that are derived from efficiently grouping the locations to be loaded are so large that they more than compensate for the extra time required to both load the data and then copy the data. In other words, the typical use of the illustrated embodiment provides a significant increase in time from the beginning of the boot phase until the end of the boot phase. Those skilled in the art will appreciate that a similar speed increase will typically be derived in other instances in which data is repetitively copied.

There has thus been described a method, apparatus and computer system for accelerating the copying of computer data that is repetitively copied from a source computer data storage medium to a destination computer data storage medium. The invention involves identifying situations in which computer data is repetitively copied and monitoring the copying, including noting the locations where the data is stored on the source computer storage medium. Without physically moving the data on the source computer storage medium, the data to be copied is gathered into groups based on the data locations in such a manner that future copying of this data from this source storage medium will be accelerated. During future copying of this data, the groups of data are copied together to the destination computer storage medium before the copying of the data is required. Although the present invention has been described in terms of various alternate embodiments and an illustrated embodiment, this is by way of illustration only. Accordingly, the scope of the present invention should be determined in light of the claims which follow.

We claim:

1. A computer-implemented method for efficiently loading data from a nonvolatile source computer storage medium containing data stored at a plurality of storage medium locations to a volatile destination computer memory medium containing a plurality of memory locations, said method comprising the steps of:

a) determining if previously grouped storage medium locations for the source storage medium are stored;

b) if previously grouped source storage medium locations are stored, loading data by:

i) receiving previously grouped source storage medium locations;

ii) loading data stored at the previously grouped source storage medium locations to the destination medium;

iii) upon receipt of a request to load data from a specified source storage medium location to the destination medium, loading the data to the destination medium by A) determining if the requested data was previously loaded to the destination medium in step b) ii);

B) if the requested data was not previously loaded to the destination medium in step b) ii), loading data stored at the specified source location to the destination storage medium;

c) if previously grouped source storage medium locations are not stored, monitoring data loading by:

i) receiving a plurality of requests to load data, each request indicating at least one specified source storage medium location from which data will be loaded;

ii) combining the received specified source storage medium locations into groups of locations such that for each group, data stored at the storage medium locations in that group can be loaded together efficiently from the source storage medium; and iii) storing the grouped source storage medium locations on a mass storage medium.

2. The method of claim 1 wherein the destination medium is random-access computer memory, wherein the source medium is a magnetic storage disk, and wherein the requests to load data occur during the initialization of the computer before application programs can be executed.

3. A method for monitoring data copied from a source computer mass storage medium containing data stored at a plurality of storage medium locations to a destination computer storage medium, said method comprising the steps of:

a) receiving a plurality of notifications, each notification indicating a request to copy data from at least one specified source storage medium location;

b) combining the received specified source storage medium locations into groups of locations such that for each group, data stored at the storage medium locations in that group can be copied together efficiently from the source storage medium; and c) storing the grouped source storage medium locations on a mass storage medium.

4. The computer-implemented method of claim 3 wherein an operating system of the computer provides executable functions invocable by computer programs other than the operating system, further comprising the initial steps of:

identifying an invocable function provided by the operating system of the computer, said function for copying data from the source storage medium; and arranging for an attempted invocation of the identified function to execute an auxiliary function different from the identified function, said execution to provide a notification of the attempted invocation of the identified function.

5. The method of claim 4 wherein invocable functions are copied into computer memory and a copied invocable function has an entry point memory address such that the function is invoked by executing an instruction stored at the entry point memory address of the function;

a memory address stored at a specified computer memory location corresponds to the entry point memory address of the identified function in such a manner that an identified function invocation executes the instruction stored at the memory address stored at the specified computer memory location; and the execution of the auxiliary function upon attempted invocation of the identified function is arranged by inserting the entry point memory address of the auxiliary function into the specified computer memory location prior to attempted invocation of the identified function.

6. The method of claim 5 wherein the entry point memory address stored in the specified computer memory location is recorded prior to insertion of the auxiliary function entry point memory address, and wherein the execution of the auxiliary function includes the execution of the function whose entry point memory address was recorded.

7. The method of claim 4 wherein arranging for a notification upon attempted invocation of the identified function involves replacing the identified function with an auxiliary function different from the identified function in such a manner that attempted invocation of the identified function results in execution of the auxiliary function and that execution of the identified function by the auxiliary function is possible, said auxiliary function execution providing for notification, further comprising the step of:

f) after receiving each notification, copying data from the at least one specified storage medium location by executing the identified function, said execution controlled by the auxiliary function.

8. The computer-implemented method of claim 3 wherein requests to copy data specify a nonvolatile source storage medium from which to copy data and a volatile destination computer memory medium to which the data will be copied.

9. The computer-implemented method of claim 3 wherein requests to copy data occur during the initialization of the computer before application programs can be executed.

10. The method of claim 3 further comprising the initial steps of:

determining if previously grouped locations of the source storage medium are stored on a mass storage medium; and executing the remaining method steps only if the previously grouped locations are not stored.

11. The method of claim 3 wherein the step of combining received specified source storage medium locations into groups further comprises the steps of:

i) specifying a location grouping proximity for the source storage medium;

ii) gathering the received specified source storage medium locations into collections such that each location in a collection is within the location grouping proximity of another location in the collection, and such that no location in a collection is within the location grouping proximity of a location that is not in the collection;

iii) replacing each collection with a range of locations that encompasses all locations within the collection; and iv) designating each remaining location and range of locations as a group of locations.

12. The computer-implemented method of claim 11 wherein the location grouping proximity is modifiable by a user of the computer.

13. The method of claim 11 wherein the location grouping proximity is specified by determining data copying performance characteristics of the source storage medium, and using determined source medium performance characteristics to calculate a location grouping proximity that will produce efficient copying of data from the selected groups of source medium locations.

14. A method for copying data from a source computer mass storage medium containing data stored at a plurality of storage medium locations to a destination computer storage medium, said method comprising the steps of:

a) receiving previously grouped source storage medium locations;

b) copying data stored at the previously grouped source storage medium locations to the destination medium;

c) receiving a plurality of notifications, each notification indicating a request to copy data from at least one specified source storage medium location to the destination medium;

d) upon receipt of each notification indicating a request to copy data from a specified source storage medium location to the destination medium, copying the data to the destination medium by i) determining if the requested data was previously copied to the destination medium in step b); and ii) if the requested data was not previously copied to the destination medium in step b), copying data stored at the specified source location to the destination storage medium.

15. The computer-implemented method of claim 14 wherein an operating system of the computer provides executable functions invocable by computer programs other than the operating system, further comprising the steps of:

identifying an invocable function provided by the operating system of the computer, said function for copying data from the source storage medium;

generating notifications indicating requests to copy data from at least one specified source storage medium location by arranging for an attempted invocation of the identified function to execute an auxiliary function different from the identified function, said execution to provide a notification;

after copying the data to the destination medium, determining the destination storage medium location to which the data from the specified source location was copied and specifying the determined destination storage medium location as the location of the copied data.

16. The method of claim 14 wherein the request to copy data to the destination medium specifies a particular destination storage medium location, and the step of copying the data to the destination medium upon receipt of each notification indicating a request to copy data from a specified source storage medium location is accomplished by:

i) determining if the specified source location is among the previously grouped source storage medium locations from which data was copied to the destination medium;

ii) if the specified source location is among the previously grouped source storage medium locations from which data was copied to the destination medium, determining the destination storage medium location to which the data from the specified source location was copied, and copying the data from the determined destination storage medium location to the particular destination storage medium location; and iii) if the specified source location is not among the previously grouped source storage medium locations from which data was copied to the destination medium, copying the data stored at the specified source location to the particular destination storage medium location.

17. The method of claim 16 wherein if the specified source location is among the previously grouped source storage medium locations, monitoring the data integrity of the data at the determined destination storage medium location such that the step of copying the data from the determined destination storage medium location to the particular destination storage medium location will occur only if the data at the determined destination storage medium location remains unchanged from when the data was first copied to the determined destination location, and if the data is changed, copying the data stored at the specified source location to the particular destination storage medium location.

18. The computer-implemented method of claim 14 wherein the destination medium is volatile computer memory and the source medium is a nonvolatile computer storage medium.

19. The method of claim 14 wherein the step of copying data stored at the previously grouped source storage medium locations to the destination medium is performed by i) determining temporary locations of destination memory such that the determined temporary locations will not be used as storage locations during method execution except as specified in step iii);

ii) specifying the determined temporary locations as available remaining locations; and iii) while remaining locations are available, copying data stored at the previously grouped source storage medium locations to available remaining locations through execution of the identified function, and designating remaining locations to which data is copied as not available.

20. The method of claim 15 wherein invocable functions are copied into computer memory and a copied invocable function has an entry point memory address such that the function is invoked by executing an instruction stored at the entry point memory address of the function;

a memory address stored at a specified computer memory location corresponds to the entry point memory address of the identified function in such a manner that an identified function invocation executes the instruction stored at the memory address stored at the specified computer memory location;

the execution of the auxiliary function upon attempted invocation of the identified function is arranged by inserting the entry point memory address of the auxiliary function into the specified computer memory location prior to attempted invocation of the identified function; and execution of the auxiliary function does not include execution of the function whose entry point memory address was stored in the specified computer memory location prior to insertion of the auxiliary function entry point memory address.

21. The method of claim 15 wherein arranging for an attempted invocation of the identified function to execute an auxiliary function different from the identified function involves replacing the identified function with an auxiliary function different from the identified function in such a manner that attempted invocation of the identified function results in execution of the auxiliary function, further comprising the steps of:

f) after receiving a plurality of notifications, combining the received specified source storage medium locations into groups of locations such that for each group, the data stored at the storage medium locations in that group can be copied together efficiently from the source storage medium; and g) storing the grouped source storage medium locations on a mass storage medium.

22. An apparatus for monitoring data copied from a source mass computer storage medium containing data stored at a plurality of storage medium locations to a destination computer storage medium, said apparatus comprising:

a data copy monitor that monitors copying of data from a source storage medium and records source storage medium locations from which data is copied;

a storage medium location grouper that receives recorded source storage medium locations from the data copy monitor and combines the recorded locations into groups of locations that can be copied together efficiently;

a storage medium grouped location storer that receives grouped storage medium locations from the storage medium location grouper and stores the groups of locations on a mass storage medium.

23. The apparatus of claim 22 wherein recorded source storage medium locations are combined into groups of locations that can be copied together efficiently by retrieving a location grouping proximity for the source storage medium;

gathering the recorded source storage medium locations into collections such that each location in a collection is within the location grouping proximity of another location in the collection, and such that no location in a collection is within the location grouping proximity of a location that is not in the collection;

replacing each collection with a range of locations that encompasses all locations within the collection; and designating each remaining location and range of locations as a group of locations.

24. The apparatus of claim 23 wherein the destination computer storage medium is random-access computer memory, and the location grouping proximity is used to group source storage medium locations to allow for loading data from a plurality of source locations efficiently together into random-access memory.

25. The apparatus of claim 23 further comprising:

a source storage medium descriptor that provides information on data copying performance characteristics of a source storage medium; and a grouping proximity calculator that receives source storage medium data copying performance characteristics from the source storage medium descriptor, and that calculates a location grouping proximity for a source storage medium based on the source performance characteristics.

26. The apparatus of claim 23 wherein the source or destination storage medium is part of a computer system, further comprising:

a grouping proximity setter that allows a user of the computer system to specify a location grouping proximity for a source storage medium, said grouping proximity setter providing information to the storage medium location grouper.

27. The apparatus of claim 22 wherein the source or destination storage medium is part of a computer system and wherein the operating system of the computer system provides executable functions invocable by computer programs other than the operating system, further comprising:

an executable function replacer that replaces an executable function provided by the operating system with an auxiliary function, the auxiliary function different from the replaced function, in such a manner that attempted invocation of the replaced function results in execution of the auxiliary function, and in such a manner that execution of the replaced function by the auxiliary function is possible.

28. An apparatus for copying data from a source computer storage medium containing data stored at a plurality of storage medium locations to a destination computer storage medium containing a plurality of storage medium locations, said apparatus comprising:

a storage medium grouped location receiver that receives previously grouped source storage medium locations;

a grouped data copier that receives information from the storage medium grouped location receiver and that copies data stored at previously grouped source storage medium locations to the destination medium;

a data copy request monitor that monitors requests to copy data from a specified source storage medium location to the destination medium;

a copied data determiner that receives information from the data copy request monitor and determines if data from a specified source storage medium location is stored on the destination medium; and a conditional data copier that receives information from the copied data determiner and copies data from a specified source storage medium location to the destination medium if the data is not stored on the destination medium.

29. The apparatus of claim 28 wherein the destination computer storage medium is random-access computer memory, and wherein the apparatus further comprises:

a storage medium location grouper that receives information from the data copy request monitor and that combines specified source storage medium locations into groups of locations from which data can be loaded together efficiently into random-access memory; and a storage medium grouped location storer that receives information from the storage medium location grouper and stores the groups of locations.

30. The apparatus of claim 28 wherein the source or destination storage medium is part of a computer system and wherein the operating system of the computer system provides executable functions invocable by computer, programs other than the operating system, and wherein the apparatus further comprises:

an executable function replacer that replaces an executable function provided by the operating system with an auxiliary function, the auxiliary function different from the replaced function, in such a manner that attempted invocation of the replaced function results in execution of the auxiliary function and in such a manner that execution of the replaced function by the auxiliary function is possible.

31. The apparatus of claim 28 wherein the copied data determiner further monitors data integrity of data copied from a specified source storage medium location and determines if copied data stored on the destination medium has remained unchanged since the data was copied to the destination medium.

32. The apparatus of claim 28 further comprising:

a storage medium location grouper that receives information from the data copy request monitor and that combines specified source storage medium locations into groups of locations that can be copied together efficiently by i) retrieving a location grouping proximity for the source storage medium;

ii) gathering the recorded source storage medium locations into collections such that each location in a collection is within the location grouping proximity of another location in the collection, and such that no location in a collection is within the location grouping proximity of a location that is not in the collection;

iii) replacing each collection with a range of locations that encompasses all locations within the collection; and iv) designating each remaining location and range of locations as a group of locations.

33. The apparatus of claim 28 wherein a data copy request monitored by the data copy request monitor indicates a particular destination storage medium location to which data from a specified source storage medium location is to be copied;

the conditional data copier copies data from the specified source storage medium location to the particular destination medium location if the data is not stored on the destination medium; and the conditional data copier copies data, previously copied from the specified source storage medium location to a current destination storage medium location on the destination medium, from the current destination storage medium location to the particular destination medium location if the data is on the destination medium at the current destination storage medium location and is unchanged since it was copied.

34. An article of manufacture comprising a computer-readable medium and a computer program embodied therein for copying data from a source computer storage medium containing data stored at a plurality of storage medium locations to a destination computer storage medium containing a plurality of storage medium locations, said computer program comprising:

a storage medium grouped location receiver that receives previously grouped source storage medium locations;

a grouped data copier that receives information from the storage medium grouped location receiver and that copies data stored at previously grouped source storage medium locations to the destination medium;

a data copy request monitor that monitors requests to copy data from a specified source storage medium location to the destination medium;

a copied data determiner that receives information from the data copy request monitor and determines if data from a specified source storage medium location is stored on the destination medium; and a conditional data copier that receives information from the copied data determiner and copies data from a specified source storage medium location to the destination medium if the data is not stored on the destination medium.

35. The article of manufacture of claim 34 wherein the computer program can additionally monitor data copied from the source medium, further comprising:

a storage medium location grouper that receives source storage medium locations from the data copy request monitor and combines the received locations into groups of locations that can be copied together efficiently; and a storage medium grouped location storer that receives grouped storage medium locations from the storage medium location grouper and stores the groups of locations on a computer-readable medium.

36. The article of manufacture of claim 34 wherein the destination computer storage medium is random-access memory of a computer system and wherein the monitored data copy requests are requests to load data into the random-access computer memory during the initialization of the computer system before application programs can be executed.

37. A method for copying data to temporarily available medium locations on a computer memory storage medium containing a plurality of memory locations, such that said temporarily available locations will not be used during method execution except as specified in the method, said method comprising the steps of:

a) identifying a series of computer operations that are repetitively performed;

b) determining temporary locations of computer memory such that the determined temporary locations will not be used as storage locations during the performance of the computer operations except as specified in step c) by i) determining if the contents of computer memory locations change during a performance of the computer operations;

ii) identifying computer memory locations whose contents do not change during the performance as a determined temporary location;

iii) storing the determined temporary locations;

c) during a later performance of the computer operations, copying data to temporary locations by i) retrieving the stored determined temporary;

ii) specifying the retrieved determined temporary locations as available remaining locations; and iii) while remaining locations are available, copying data to available remaining locations, and designating remaining locations to which data is copied as not available.

38. The method of claim 37 wherein the computer memory storage medium is part of a computer system running an operating system, wherein the computer memory storage medium is random-access memory, wherein the series of computer operations are performed during initialization of the computer before application programs can be executed, wherein the operating system of the computer does not have the capability to allocate random-access memory locations to software programs, and wherein the data copied to medium locations temporarily available during initialization of the computer is used to accelerate the initialization.

* * * * *